United States Patent
Shah et al.

(10) Patent No.: US 12,523,984 B2
(45) Date of Patent: Jan. 13, 2026

(54) INDUSTRIAL AUTOMATION EDGE AS A SERVICE

(71) Applicant: Rockwell Automation Technologies, Inc., Mayfield Heights, OH (US)

(72) Inventors: Chirayu S Shah, Milwaukee, WI (US); Jennifer M Kite, Saint Francis, WI (US); James Michael Teal, New Brunswick, NJ (US); Bruce McCleave, Jr., Mission Viejo, CA (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 846 days.

(21) Appl. No.: 17/830,499

(22) Filed: Jun. 2, 2022

(65) Prior Publication Data

US 2023/0393555 A1    Dec. 7, 2023

(51) Int. Cl.
 G05B 19/4155    (2006.01)
 H04L 41/149    (2022.01)

(52) U.S. Cl.
 CPC ........ G05B 19/4155 (2013.01); H04L 41/149 (2022.05); G05B 2219/31229 (2013.01)

(58) Field of Classification Search
 CPC ...... G05B 19/4155; G05B 2219/31229; H04L 41/149
 See application file for complete search history.

(56) References Cited

U.S. PATENT DOCUMENTS 10,791,063 B1    9/2020   Florissi et al.
11,086,298 B2    8/2021   Chand et al.
(Continued)

FOREIGN PATENT DOCUMENTS

EP    3 726 320 A1    10/2020
EP    3 926 423 A1    12/2021
EP    3 929 685 A1    12/2021

OTHER PUBLICATIONS

Non-Final Office Action received for U.S. Appl. No. 17/830,612, dated Sep. 19, 2024, 53 pages.
Notice of Allowance for U.S. Appl. No. 17/830,612, dated Dec. 13, 2024.
Extended European Search Report received for European Patent Application Serial No. 23173920.2 dated Sep. 26, 2023, 7 pages.
(Continued)

Primary Examiner — William P Bartlett
(74) Attorney, Agent, or Firm — Amin, Turocy & Watson, LLP

(57) ABSTRACT

A cloud-based edge-as-as-service (EaaS) system allows edge gateways to be easily configured and deployed on the cloud for collection, contextualization, and egress of industrial data to downstream applications, including analytic applications, work order management systems, or visualization systems. The EaaS system uses predefined device profiles to automatically discover relevant data items on plant floor devices and present these data items to a user. Model configuration interfaces served by the EaaS system allow the user to map selected data items to predefined models for organizing or contextualizing the selected data, and for egressing the contextualized data to the target applications. These model configurations can be deployed on the cloud platform as edge gateways that use the resulting information models to collect and contextualize relevant items of device data during runtime and to export the modeled data to the target application.

20 Claims, 17 Drawing Sheets

(56) References Cited

U.S. PATENT DOCUMENTS

| | | |
|---|---|---|
| 12,271,181 B2 | 4/2025 | Shah et al. |
| 2003/0216888 A1 | 11/2003 | Ridolfo |
| 2014/0047107 A1 | 2/2014 | Maturana et al. |
| 2015/0016249 A1* | 1/2015 | Mukundan .............. H04L 12/66 370/230 |
| 2018/0052451 A1* | 2/2018 | Billi-Duran ...... G05B 19/41835 |
| 2018/0356792 A1 | 12/2018 | Chao et al. |
| 2020/0067789 A1* | 2/2020 | Khuti .................. H04L 41/5009 |
| 2020/0326684 A1* | 10/2020 | Chand .................. G05B 23/024 |
| 2021/0003996 A1 | 1/2021 | Nagabhairava et al. |
| 2021/0096541 A1 | 4/2021 | Sayyarrodsari et al. |
| 2021/0097456 A1 | 4/2021 | Sayyarrodsari et al. |
| 2022/0043431 A1 | 2/2022 | Sayyarrodsari et al. |
| 2022/0147000 A1 | 5/2022 | Cooley et al. |

OTHER PUBLICATIONS

Extended European Search Report received for European Patent Application Serial No. 23173547.3 dated Oct. 4, 2023, 7 pages.

Extended European Search Report received for European Patent Application Serial No. 23173581.2 dated Sep. 29, 2023, 13 pages.

Esmaeilzadeh, Komeil, "Remote Monitoring and Control of Industrial Equipment Through OPC UA and Cloud Computing", Faculty of Engineering and Natural Science, Master of Science Thesis, Apr. 2021, 99 pages.

Non-Final Office Action received for U.S. Appl. No. 17/830,648 dated Sep. 25, 2025, 19 pages.

Heyvaert et al., "Towards a Uniform User Interface for Editing Mapping Definitions", Intelligent Exploration of Semantic Data, 2015, 14 pages.

\* cited by examiner

INDUSTRIAL AUTOMATION EDGE AS A SERVICE

TECHNICAL FIELD

The subject matter disclosed herein relates generally to industrial automation systems, and, for example, to collection and analysis of industrial data.

BACKGROUND ART

Industrial devices generate a considerable amount of operational and diagnostic data. However, the process of extracting this data for use by visualization, analytic, or predictive maintenance systems can be complicated, requiring cooperative effort between both information technology (IT) and operational technology (OT) experts to ensure that the most relevant data for a given analytic application is collected from the devices and correctly interpreted and understood by the application. Moreover, much of the data available on a given set of industrial devices comprises uncontextualized, unstructured data (e.g., integer, real, or discrete values stored on the data table of an industrial controller) whose meaning must be defined by external applications used to visualize or analyze the data.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided, comprising a user interface component configured to render configuration interfaces on a client device and to receive, via interaction with the configuration interfaces, configuration input that defines properties of an edge gateway to be executed on a cloud platform; wherein the system is configured to instantiate the edge gateway on the cloud platform based on the configuration input, the edge gateway comprising, an edge gateway component configured to collect device data from data tags of industrial devices specified by the configuration input, and an egress component configured to contextualize the device data based on an information model created based on the configuration input to yield modeled data, and to send the modeled data to a target application based on data mappings defined by the information model.

Also, one or more embodiments provide a method, comprising rendering, by a system comprising a processor and executing on a cloud platform, configuration interfaces on a client device; receiving, by the system via interaction with the configuration interfaces, configuration input that defines properties of an edge gateway to be executed on the cloud platform; deploying, by the system, the edge gateway on the cloud platform based on the configuration input, wherein the deploying comprises; generating an information model based on the configuration input, collecting, by the edge gateway, device data from data tags of industrial devices in accordance with the information model, contextualizing, by the edge gateway, the device data based on the information model, and sending, by the edge gateway, the modeled data to a target application based on data mappings defined by the information model.

Also, according to one or more embodiments, a non-transitory computer-readable medium is provided having stored thereon instructions that, in response to execution, cause a system executing on a cloud platform to perform operations, the operations comprising rendering, configuration interfaces on a client device; receiving, via interaction with the configuration interfaces, configuration input that defines properties of an edge gateway to be executed on the cloud platform; and deploying the edge gateway on the cloud platform based on the configuration input, wherein the deploying comprises generating an information model based on the configuration input, collecting, by the edge gateway, device data from data tags of industrial devices in accordance with the information model, contextualizing, by the edge gateway, the device data based on the information model, and sending, by the edge gateway, the modeled data to a target application based on data mappings defined by the information model.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
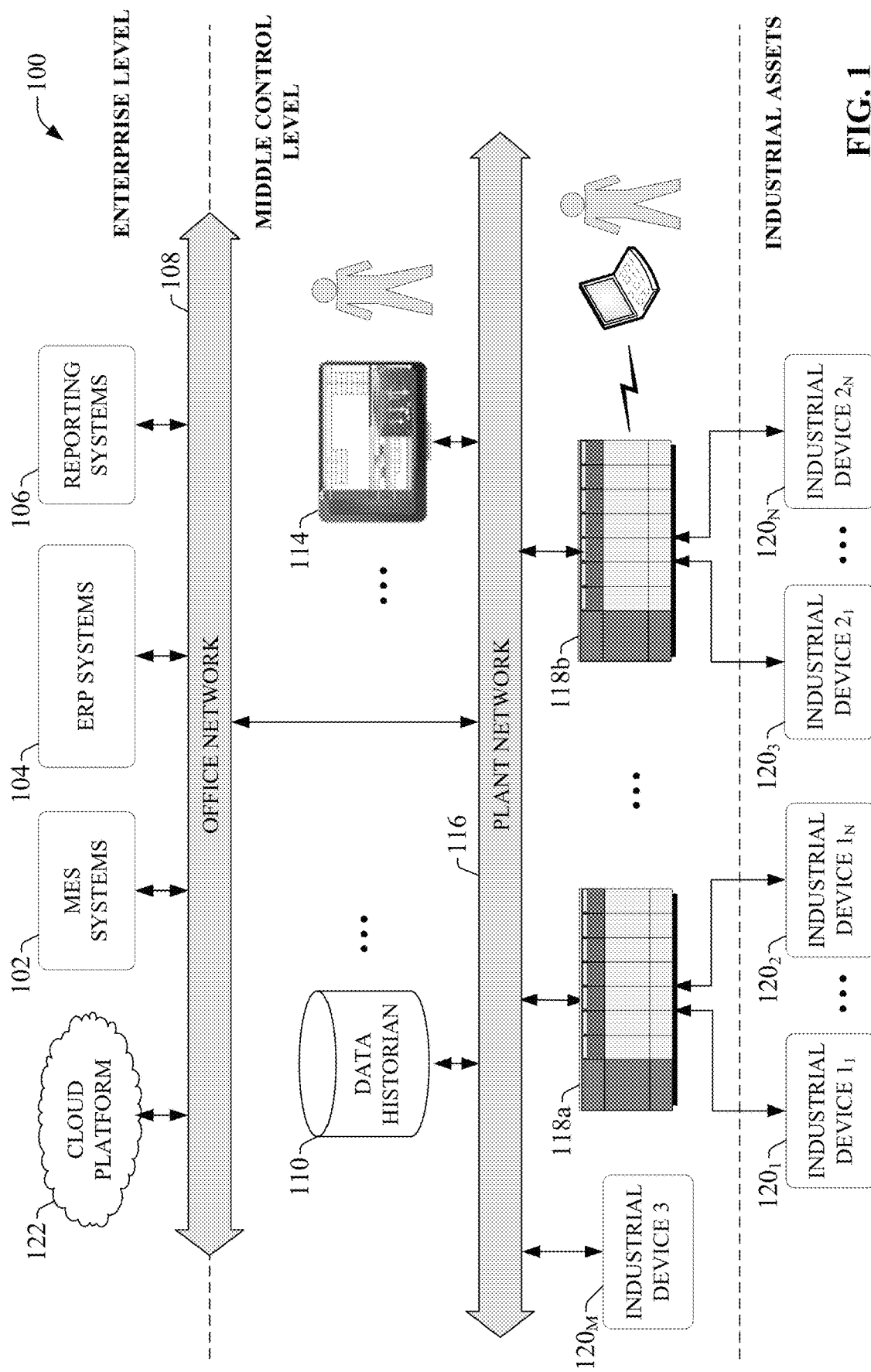
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated 110 devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device $120_M$, may operate autonomously on the plant network 116 without being controlled by an industrial controller 118.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. Such higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level given higher-level business considerations. Reporting systems 106 can collect operational data from industrial devices on the plant floor and generate daily or shift reports that summarize operational statistics of the controlled industrial assets.

As industrial enterprises move toward cloud-based data collection and analytic solutions, on-premise edge devices are being used to aggregate data of interest from industrial devices and migrate that data to higher level systems for storage, visualization, or analysis. However, this approach requires each edge device to be individually configured to collect the relevant data items and to map those items to the high level or downstream applications. Configuring these edge devices to collect and migrate data of interest can require a considerable amount of time and effort, particularly if a given enterprise has deployed multiple edge devices at various geographically diverse plant facilities.

Moreover, much of the information available on a given set of industrial devices comprises uncontextualized, unstructured data (e.g., integer, real, or discrete values stored on the data table of an industrial controller) whose meaning must be defined by external applications used to visualize or analyze the data. This places a burden on the developers of such applications, who must designate the meaning of each item of unstructured data received and rendered by these applications so that the data will have meaning to the viewer (e.g., a product count, a production rate, a system temperature or pressure, a historical trend, etc.).

To address these and other issues, one or more embodiments described herein provide a cloud-based system that can be used to configure and manage a distributed set of edge devices using a centralized configuration interface. This cloud-based system supports a variety of edge management tools collectively referred to as Edge as a Service (EaaS), which allow users to centrally deploy, edit, and monitor edge device configurations using cloud-based services. The software services offered by the EaaS platform include edge gateway applications, which can be easily configured to collect data sets relevant to an analytic objective, contextualize the data based on cloud-level or device-level models, and egress the resulting modeled data t external applications such as predictive or prescriptive analytics applications. Edge gateway applications use device profiles to automatically discover and retrieve industrial device data tags or smart objects that are relevant to analytics objectives, and provide tools that allow a user to easily map these data tags or smart objects to information models for egress to external or high-level applications (e.g., visualization, work order management, predictive or prescriptive analytics, etc.).

Figure 2:
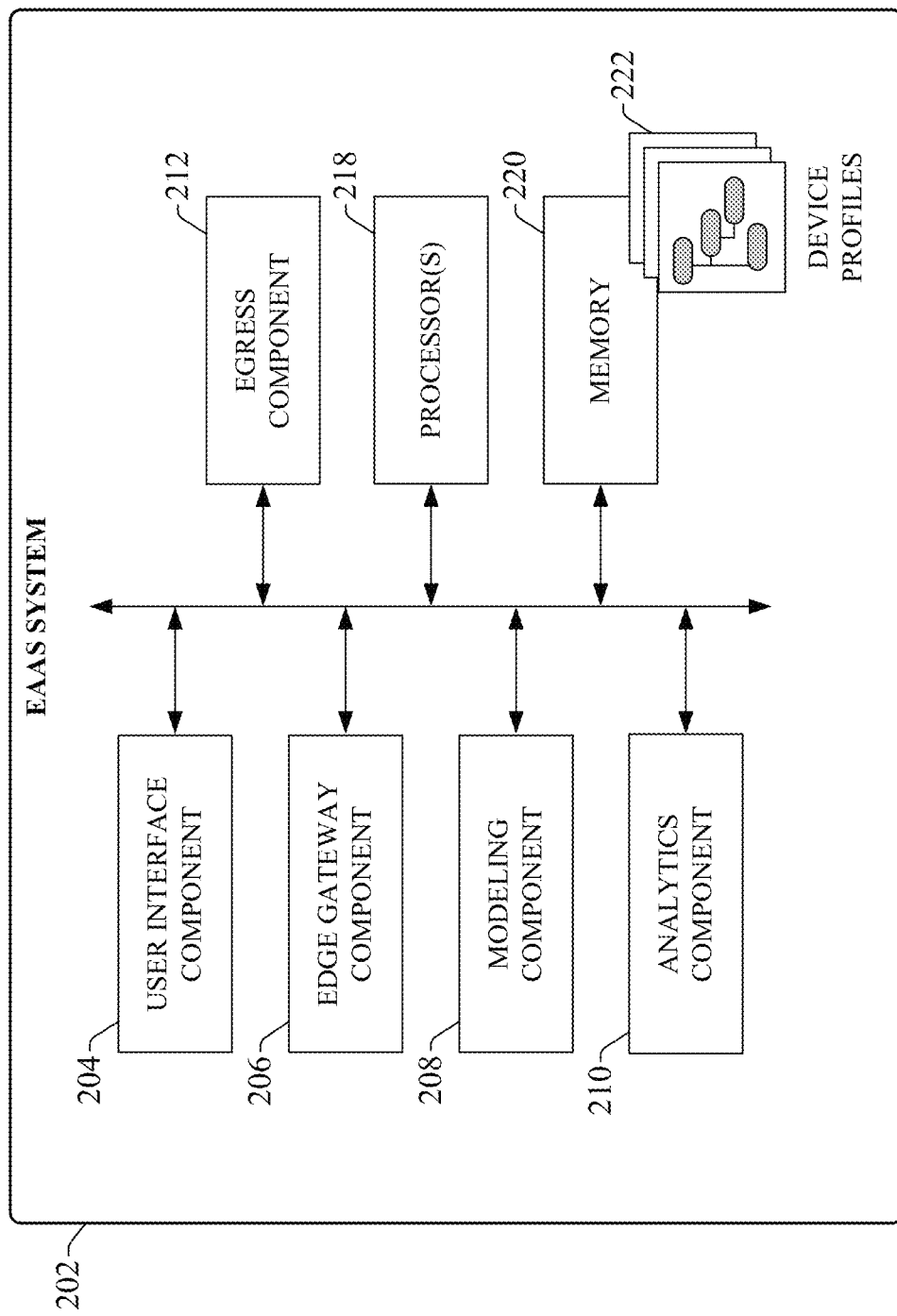
FIG. 2 is a block diagram of an example Edge as a Service (EaaS) system.

FIG. 2 is a block diagram of an example Edge as a Service (EaaS) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

EaaS system 202 can include a user interface component 204, an edge gateway component 206, a modeling component 208, an analytics component 210, an egress component 212, one or more processors 218, and memory 220. In various embodiments, one or more of the user interface component 204, edge gateway component 206, modeling component 208, analytics component 210, egress component 212, the one or more processors 218, and memory 220 can be electrically and/or communicatively coupled to one another to perform one or more of the functions of the EaaS system 202. In some embodiments, components 204, 206, 208, 210, and 212 can comprise software instructions stored on memory 220 and executed by processor(s) 218. EaaS system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to exchange information between the EaaS system 202 and a client device having authorization to access the EaaS platform. In some embodiments, user interface component 204 can be configured to generate and deliver interface displays to the client device that allow the user to browse data tags or smart objects discovered on industrial devices, select data items to be mapped to an information model, deploy applications to devices at plant facilities, or perform other such interactions with the system 202. User interface component 414 can also visualize collected data in various formats, including time-series plots, animated visualizations, results of predictive or prescriptive analytics applied to the data, or other such formats.

Edge gateway component 206 can be configured to discover industrial devices in service at a plant facility—e.g., industrial controllers, telemetry devices, motor drives, etc.—as well as data tags or smart objects available on those devices. In some embodiments, the edge gateway component 206 can leverage device profiles 222 to identify and retrieve data items that are relevant to specified types of analytics or business objectives. The edge gateway component 206 can also be configured to retrieve selected subsets of these data items during operation and contextualize this data using information models based on automated or user-defined bindings between the data and the information models.

Modeling component 208 can be configured to generate the information models used to contextualize the collected data and map the contextualized data to a target application. Analytics component 210 can be configured to apply machine learning models or other types of analytic models to the contextualized data. Egress component 212 can be configured to send the contextualized data to a target application in accordance with automatically generated or user-defined mappings between the data items and the information model.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
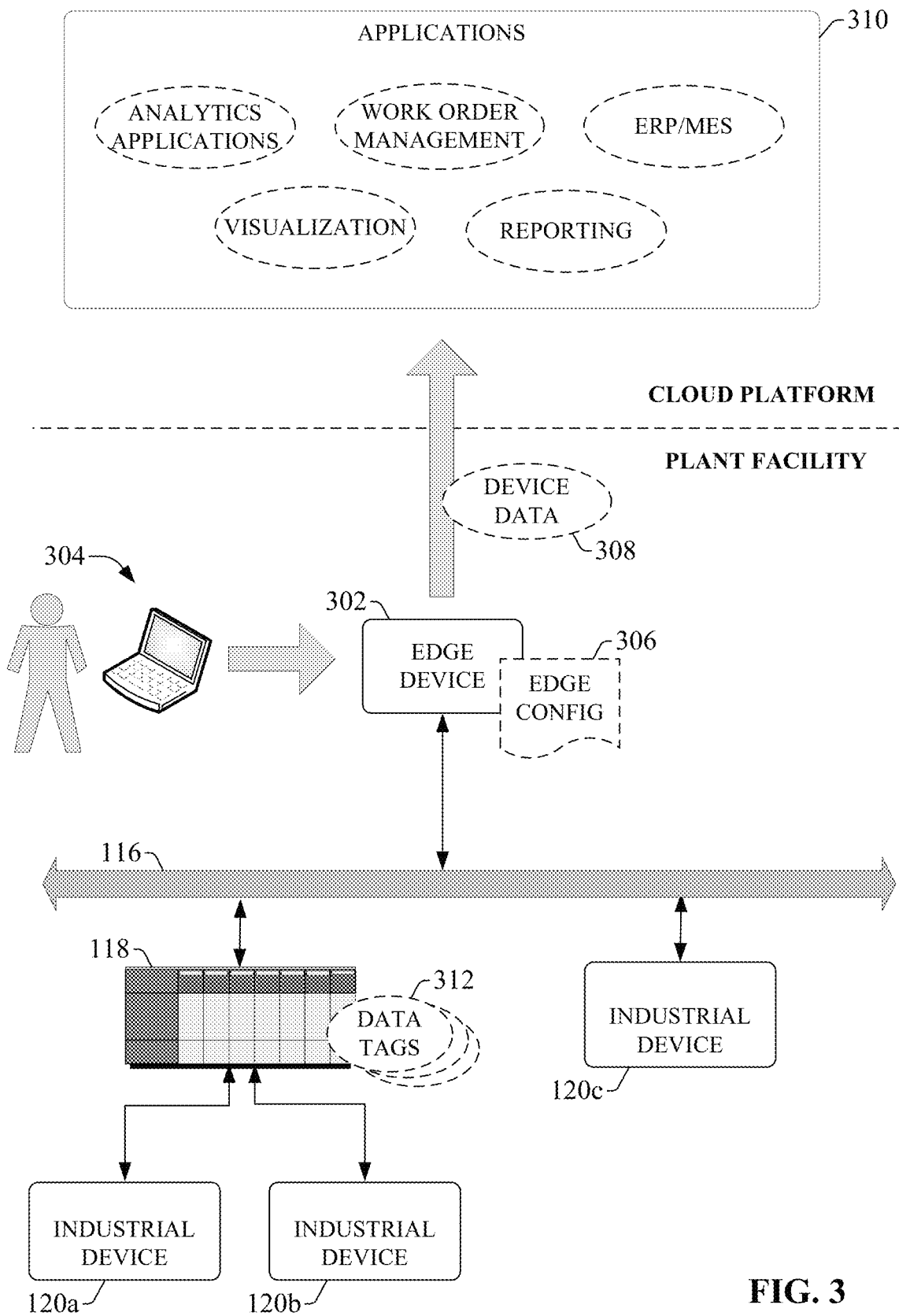
FIG. 3 is a diagram illustrating migration of plant floor data to one or more external applications by an edge device.

FIG. 3 is a diagram illustrating migration of plant floor data to one or more external applications 310 by an edge device 302. In this example, the edge device 302 is a network infrastructure device that resides on the plant network 116 and communicatively links devices on the network 116 to external networks or systems, such as cloud-based applications 310. The edge device 302 can aggregate device data 308 from industrial devices that make up one or more automation systems in operation within the plant facility. Some of this device data 308 can be obtained from data tags 312 defined on industrial controllers 118, which store data generated internally by the control program being executed by the controller 118 as well as data generated by industrial devices (e.g., devices 120a and 120b) connected to the controller's I/O. The edge device 302 may also collect data from industrial devices or systems—such as industrial device 120c—that operate on the plant network 116 without being interfaced with the industrial controller 118 (e.g., motor drives, vision systems, etc.). Target applications 310 to which the edge device 302 can send the device data 308 can include, but are not limited to, cloud-based analytics applications, visualization systems that provide graphical views of the data 308, work order management systems that automatically generate work orders when the device data 308 indicates a maintenance concern, reporting systems, ERP or MES systems, or other such consumers of industrial device data 308.

To configure the edge device 302 to collect and migrate desired data items, a user must locally log onto and configure the edge device 302; e.g., using a client device 304 that interfaces with the edge device 302 either via a direct connection or over the local network 116. Configuring the edge device 302 may involve specifying which data tags 312 or data items are to be collected, defining a target application to which the data is to be sent, defining any data mappings between the selected data items and data containers of the target application, or defining other such data migration properties. If multiple edge devices 302 are deployed across geographically distributed plant facilities, engineers may have to spend considerable time and effort configuring and managing each edge device locally 302. Moreover, when new industrial assets are commissioned at a given plant facility, the engineer must revisit the facility to reconfigure the edge device 302 to collect and migrate data from the new assets.

Figure 4:
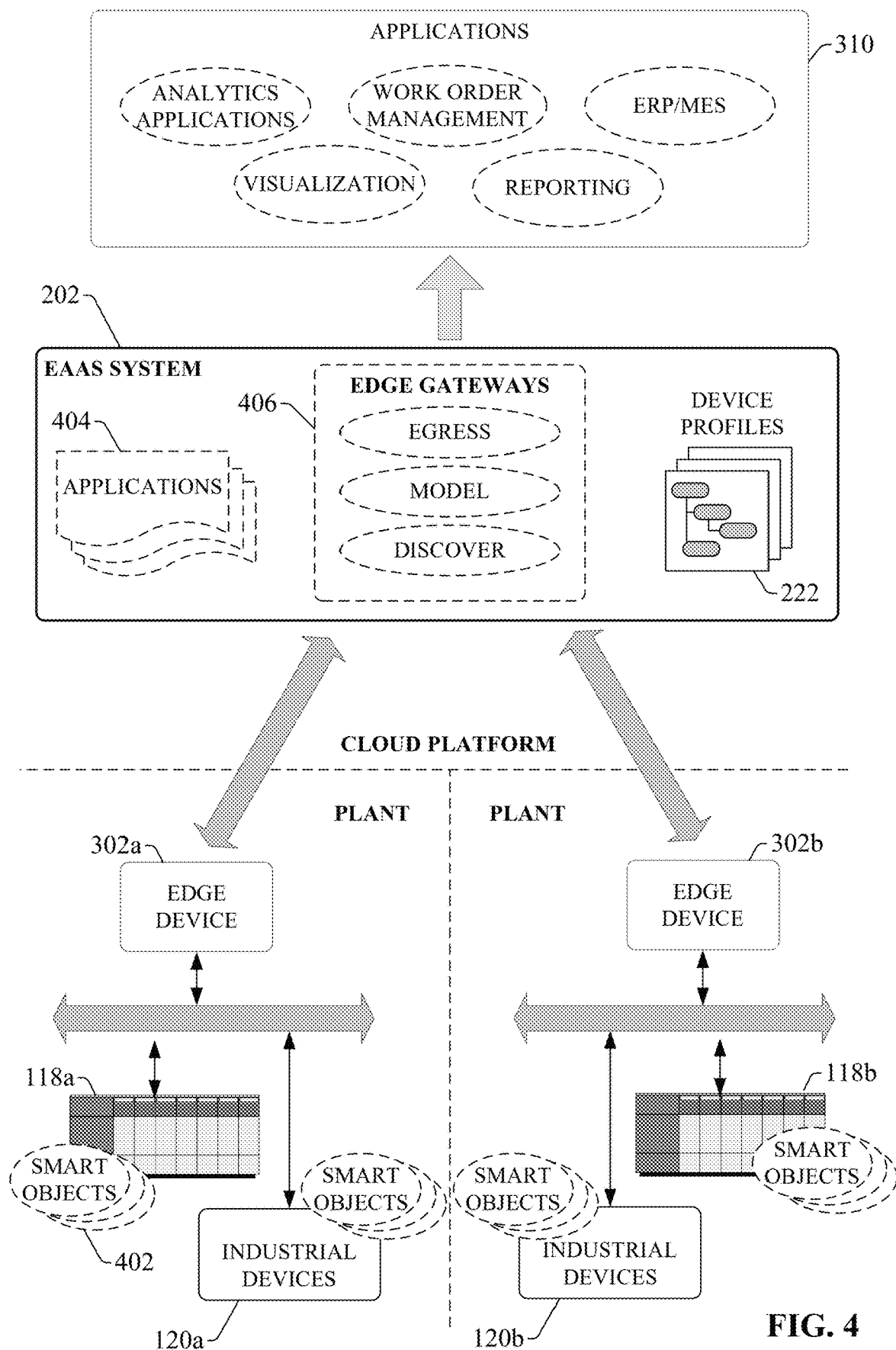
FIG. 4 is a diagram illustrating a general architecture comprising a cloud-based EaaS system that is used to configure multiple edge devices and that acts as a platform for mapping data from the edge devices to external or cloud-based applications.

As an alternative to this approach, one or more embodiments of the EaaS system 202 can allow a user to remotely configure and manage multiple edge devices 302 using a single centralized interface that executes on a cloud platform. FIG. 4 is a diagram illustrating a general architecture comprising a cloud-based EaaS system 202 that is used to configure multiple edge devices 302 and that acts as a platform for mapping data from the edge devices 302 to external or cloud-based applications 310. In general, the EaaS system 202 is a cloud-based platform that allows users to deploy various types of applications 404 to devices at their plant facilities and to manage these applications via a single cloud-based interface. Example applications 404 that can be deployed and managed via the EaaS system 202 can include, but are not limited to, instantiations of cloud-based edge gateways 406 (to be described in more detail herein), machine learning models, analytic models, office software, or other types of applications. In some embodiments, the EaaS platform can make these applications 404 available to users via a cloud-based application marketplace, allowing users to selectively purchase, deploy, and use these applications within their enterprises.

Edge devices 302 may reside at different locations within a plant facility or may be distributed across multiple plant facilities. As will be described in more detail below, collection of industrial device data from the edge devices 302 (or directly from the industrial controllers 118 and industrial devices 120), contextualization of this data in the cloud, and mapping of the resulting contextualized data to one or more target applications can be configured using instances of edge gateways 406, which can be deployed by the EaaS system 202 and centrally managed from the cloud platform. A user with suitable access permissions can remotely log into the EaaS system 202 to view and edit the edge gateways 406 associated with that user's industrial enterprise via the cloud platform. Edge gateways 406 can utilize device profiles 222 made available on the EaaS platform to automatically discover, retrieve, and model device data relevant to analytic or business objectives. Egress services supported by the edge gateways 406 allow the user to easily map the modeled data to target applications 310.

Although the example architecture illustrated in FIG. 4 depicts the EaaS system 202 and its edge gateways 406 interfacing with the plant floor devices (controllers 118 and devices 120) via edge devices 302 residing at the plant facilities, in some embodiments the EaaS system 202 may communicatively interface with the plant floor devices 118, 120 without the use of physical edge devices 302 at the plant facilities. In such scenarios, the edge gateways 406 can remotely access data tags or smart objects 402 on the plant floor devices via other types of network infrastructure devices on the plant network, or via another communication channel between the cloud platform and the devices 118, 120.

Figure 5:
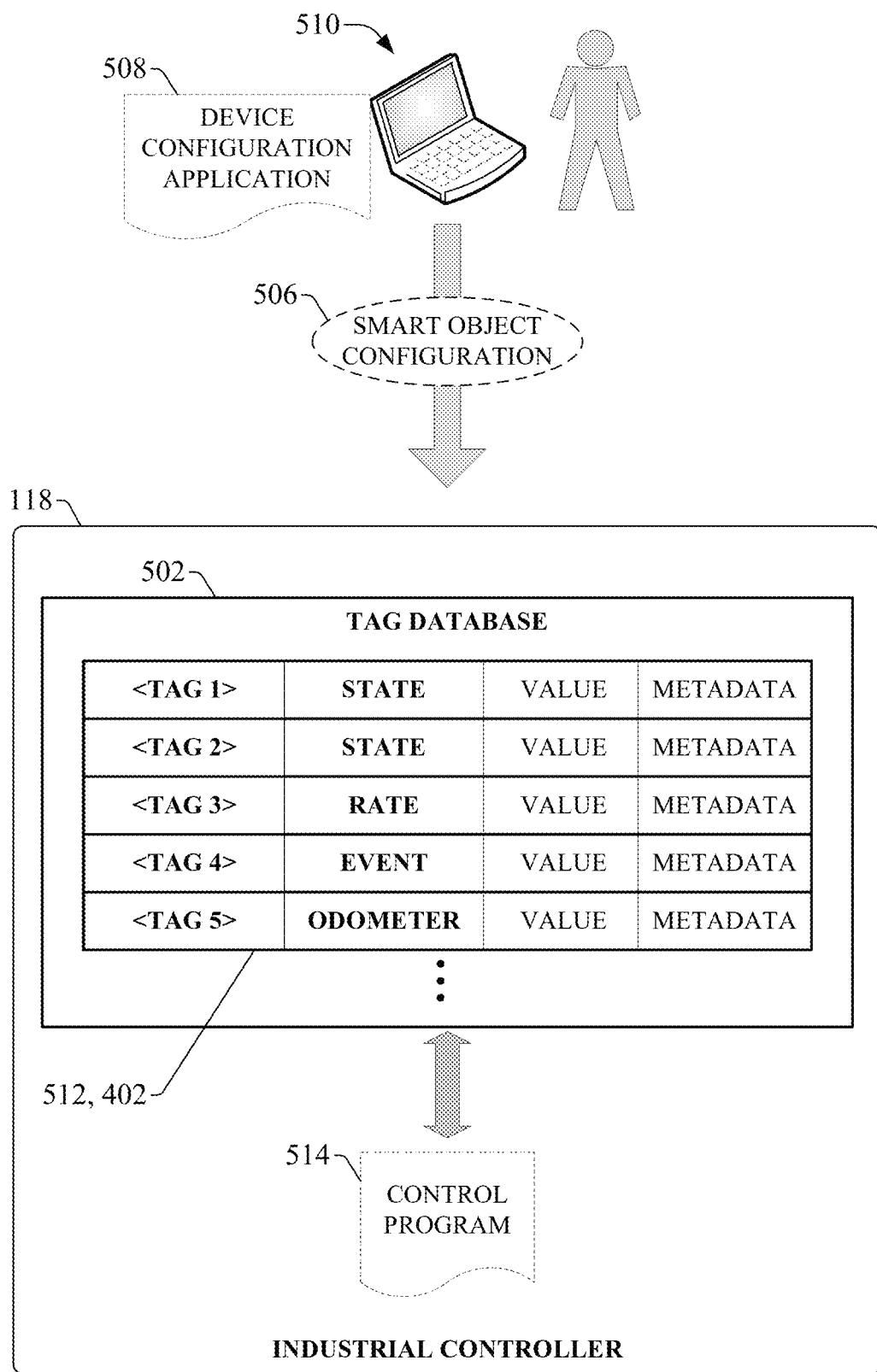
FIG. 5 is a diagram illustrating configuration of smart objects in a tag database of an industrial controller that supports smart objects.

In some embodiments, the edge gateways 406 can integrate with smart objects 402 defined on the industrial controllers 118 and devices 120. These smart objects 402 are specialized data types supported by smart industrial devices that allow items of industrial data to be contextualized or modeled at the device level, allowing for streamlined integration with higher-level applications 310 and faster translation of the data into meaningful insights. In an example configuration scenario, a user can configure smart objects 402 in an industrial controller 118 or other industrial device 120 during control program development, along with other data tags to be used by the control program. FIG. 5 is a diagram illustrating configuration of smart objects 402 in a tag database 502 of an industrial controller 118 that supports smart objects 402. Industrial controller 318 includes a tag database 502 that stores data tag definitions. The data tag definitions are configured by a user in tandem with development of control program 514 (e.g., a ladder logic program, a sequential function chart program, etc.), and define data tags 512 of various data types that are used to store and identify analog and digital data values generated and consumed by the control program 514. Example standard data types that can be represented by data tags 512 can include, for example, integer data types, real data types, Boolean data types, etc. In addition to these standard data types, one or more of the data tags 512 can include smart objects 402 (or smart tags), which conform to data types that allow for device-level modeling or contextualization of data at the controller 118.

In this example scenario, a user can configure both the control program 514 and the data tag definitions using a device configuration application 508 that executes on a client device 710 (e.g., a laptop computer, a desktop computer, a tablet computer, etc.) that is communicatively interfaced to the industrial controller 118. Device configuration application 508 can execute a program development environment or integrated development environment (IDE) that can be used to develop control program 514 and its associated data tags 512, including any smart objects 402 to be used as containers for contextualized or modeled data.

During development, the industrial controller 118 (or another type of industrial device 120 that generates data to be collected by the edge gateway 406) can create smart objects 402 corresponding to any of various smart object data types (e.g., state data types, rate data types, odometer data types, event data types, or other supported data types) in accordance with smart object configuration input 506 downloaded to industrial controller 118 by client device 510. Using device configuration application 508, the user can also configure metadata associated with each smart object 402 defined in the tag database 502 in order to customize the smart objects 402 for a given industrial application.

For example, for a State smart object 402 associated with a bottle filling machine to be controlled by industrial controller 118, the user may specify the various states to be represented by the tag (e.g., Running, Home, Abnormal, Idle, etc.). For a Rate smart object 402 representing a velocity of a conveyor that feeds bottles to the filling machine, the user can specify maximum and minimum values for the velocity value. Another Rate smart object 402 representing an average temperature may be configured to average multiple analog temperature input values specified by the user in the metadata. For an Odometer smart object 402 representing a product count (e.g., the number of filled bottles output by the filling machine), the user can configure the associated metadata to specify the data tag that triggers an increment of the odometer value (e.g., an input tag or another smart object 402 representing a "fill cycle complete" event), as well as daily shift start and shift end times between which the value of the Odometer smart object 402 will increment before being reset to zero. Metadata of an Event smart object 402 associated with a component of the filling machine can define an input address or data tag representing a state of a device (e.g., a push-button, a photo-sensor, etc.) that determines the event, or an alarm data tag corresponding to an alarm whose state (e.g., Abnormal, Normal, Acknowledged, Unacknowledged, etc.) determines the event. Other types of smart objects 402 and associated metadata are also within the scope of one or more embodiments.

Once the data tags (both standard tags and smart object 402) are configured, the tag database 502 stores the configured data tags 512 on the industrial controller, where the data tags 512 are accessible by control program 514. Data tags and smart objects 402 in tag database 502 are discoverable by edge gateways 406.

Figure 6:
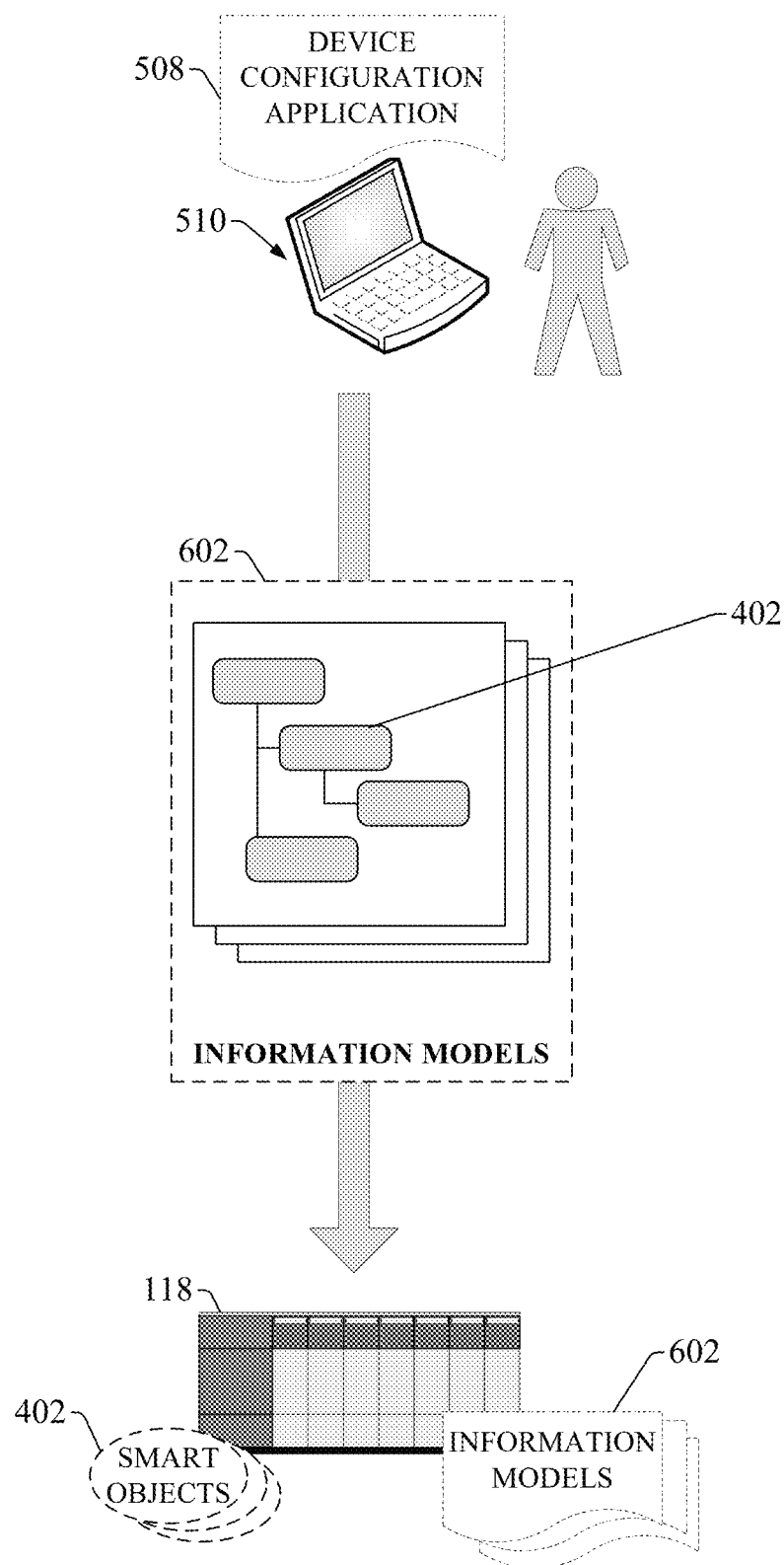
FIG. 6 is a diagram illustrating configuration of an industrial controller with one or more information model definitions.

Some industrial controllers 118 or devices 120 may also support creation of smart object information models, which define hierarchical relationships between industrial assets, associated industrial devices, production lines or areas, and data generated by the various devices associated with the industrial applications in terms of relationships between the defined smart objects 402. FIG. 6 is a diagram illustrating creation and storage of one or more information models 602 on an industrial controller 118. In some scenarios, smart object information models 602 can be defined using the same configuration application 508 or IDE that is used to program the controller 118.

Configuration application 508 allows a user to define an information model 602 of an industrial automation application or a collection of industrial automation applications being monitored and controlled by the industrial controller 118. An information model 602 defines hierarchical relationships between industrial assets, associated industrial devices, production lines or areas, and data generated by the various devices associated with the industrial applications. Using configuration application 508, a user can define and download these information models 602 to industrial controllers 118 or devices 120 that support the use of smart objects 402.

The information model 602 can be defined as a hierarchical arrangement of smart objects 402 defined on the controller 118. In particular, the information model 602 can define, as nodes of the hierarchy, hierarchical elements of an industrial asset or collection of assets, and assign selected groups of smart objects 402 to respective elements with which the smart objects 402 are associated (e.g., a node associated with an industrial asset, a unit of equipment associated with the asset, or an industrial device associated with the asset). The information model 602 is thereby configured by the user to associate the respective smart objects 402 with selected industrial machines, devices, production lines, and/or plant facilities, as well as to define hierarchical relationships between these elements.

Some embodiments of configuration application 508 can include model building tools that allow the user to build information models 602 by browsing to selected smart objects 402 defined in the industrial controller 118. The user can create nodes representing an industrial facility, production lines or areas within the industrial facility, industrial assets (e.g., industrial machine, industrial robots, etc.) within each production line, units of equipment associated with a given industrial asset (e.g., a loader, a pusher, a machining station, etc.), and/or industrial devices (e.g., controllers, drives, etc.) associated with each industrial asset. Selected smart objects 402 defined on the industrial controller 118 can then be associated with respective nodes defined in the information model 602 The information model 602 allows the user to define a hierarchical asset or plant architecture, and to group smart objects 402 within the framework in association with selected nodes representing plant production areas or production lines, industrial assets, and/or equipment and devices associated with the assets.

Figure 7:
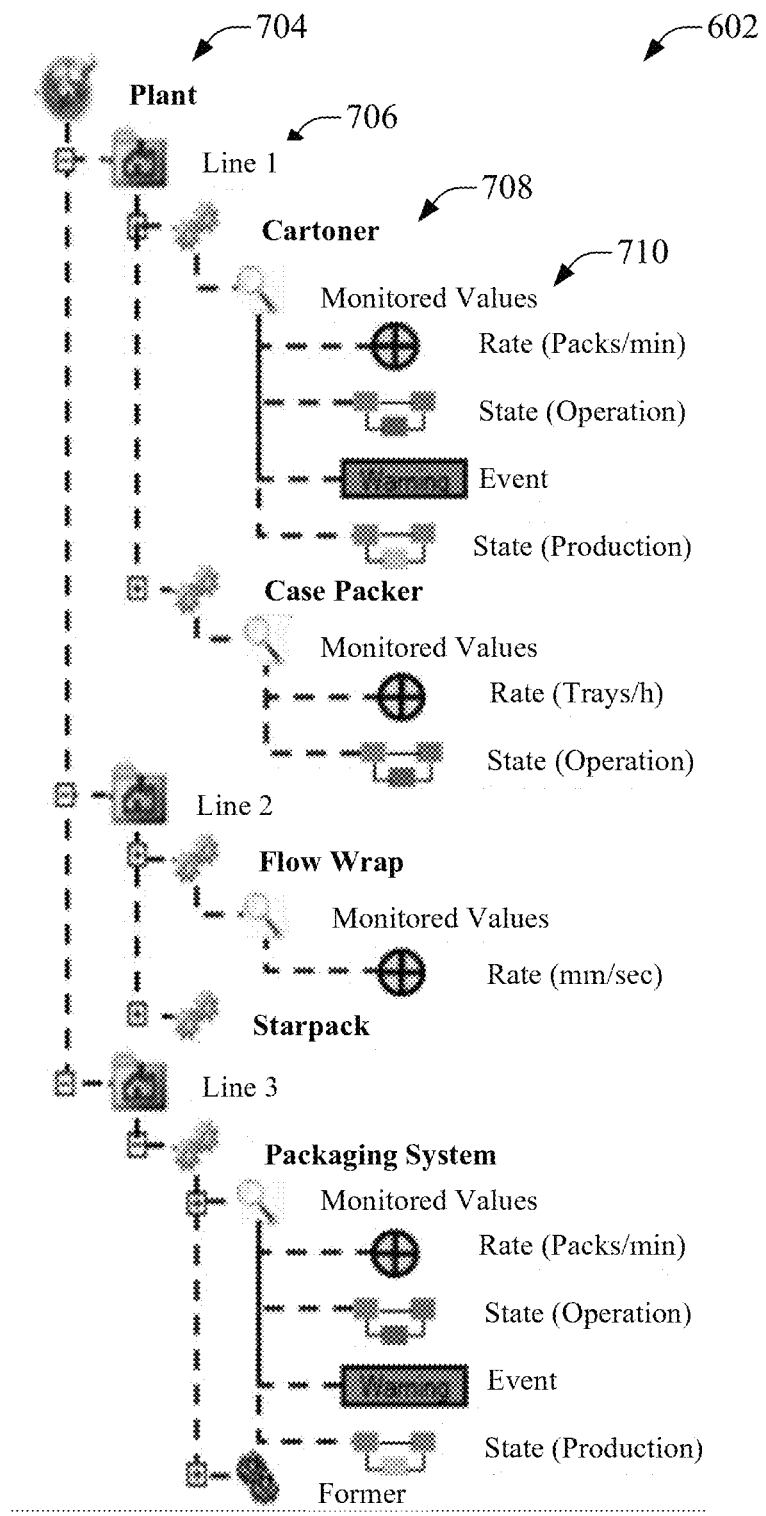
FIG. 7 is a graphical representation of an example information model.

Information models 602 defined on industrial controllers 118 and device 120, working in conjunction with the smart objects 402 defined on those devices, contextualize data generated by industrial applications at the device level. FIG. 7 is a graphical representation of an example information model 602. Example information model 602 has a single plant node 704, below which are multiple line nodes 706 (Line 1, Line 2, and Line 3), which are child nodes relative to plant node 704. Line nodes 706 represent various production lines within the plant represented by plant node 704. Each line node 706 has a number of child machine nodes 708 representing machines deployed on the line represented by the associated line node 706 (e.g., Cartoner, Case Packer, Flow Wrap, Packaging System). Each machine node 708 is associated with a number of monitored values 710, which are data values obtained from corresponding smart objects 402 configured on the industrial controller 118. The monitored values 710 may correspond to production and operation statistics, such as a production rate (obtained from a Rate smart object 402), operation and production states (obtained from State smart objects 402), or line events (obtained from Event smart objects 402). As can be seen in FIG. 7, various groups of smart objects 402—represented by the monitored values 710—are respectively assigned to a selected machine and line within the plant, as defined by the information model 602.

Figure 8:
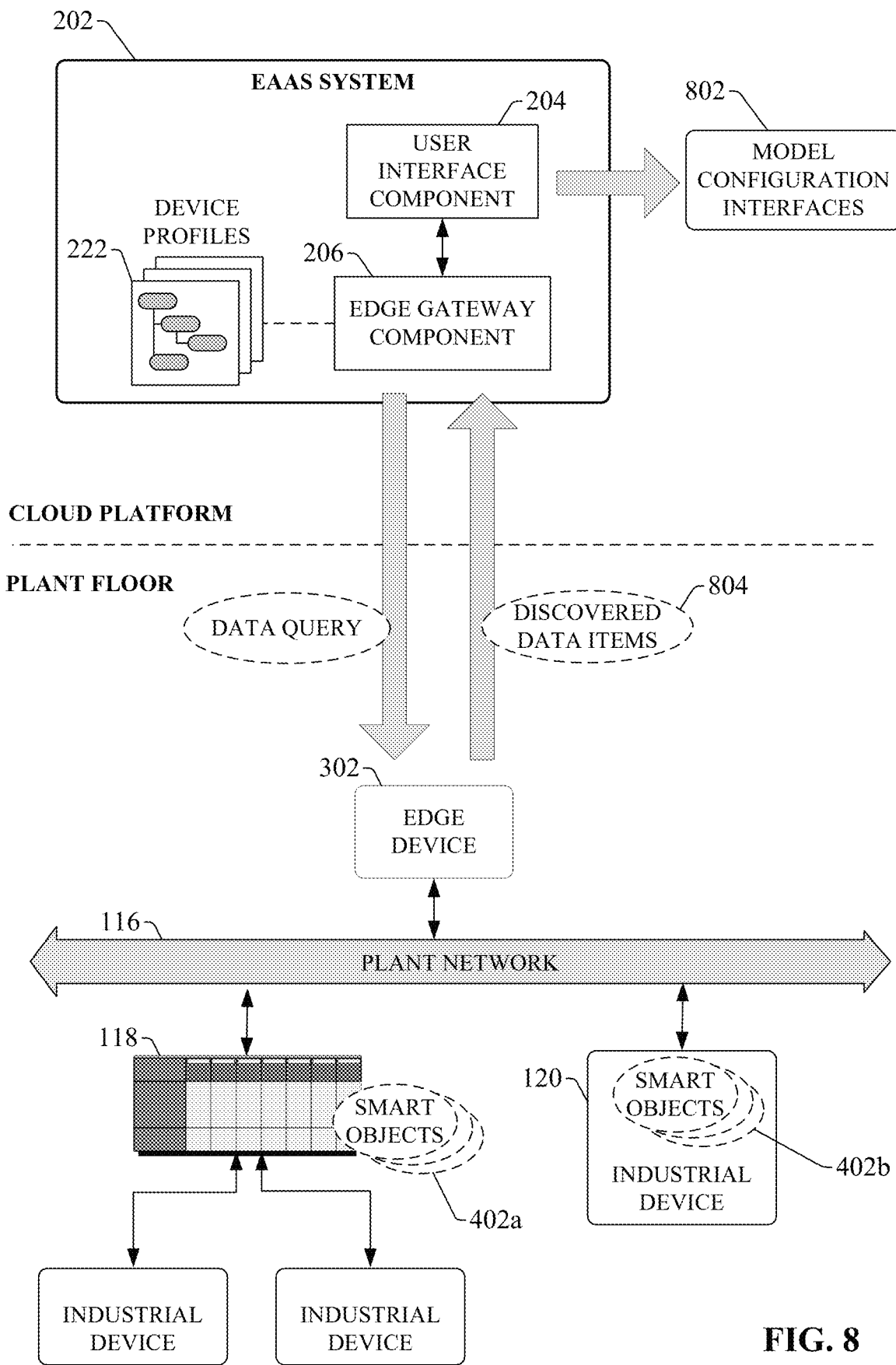
FIG. 8 is a diagram illustrating discovery of relevant plant floor data by the EaaS system.

An example workflow for configuring data collection, contextualization, and mapping to an external application 310 using edge gateways 406 is now described. FIG. 8 is a diagram illustrating discovery of relevant plant floor data by the EaaS system 2002. A user can initiate the workflow for configuring data collection, contextualization, and egress (or mapping) by logging into the EaaS system 202 and invoking a configuration interface for configuring data collection and mapping.

In some embodiments, the edge gateway component 206 can leverage device profiles 222 to identify and retrieve relevant device information—in terms of data tags or smart objects 402—from the industrial controllers 118 and devices 120 at the plant facility. Device profiles 222 can be created for respective different types of industrial devices, industrial assets, or control applications and can be made available on the EaaS platform so that users of the EaaS system 222 can access and utilize profiles 222 corresponding to their industrial assets. A given device profile 222 can define, for its corresponding device or industrial asset, a subset of data available from that device—or collection of devices that make up an industrial machine or asset—that is relevant to an analytic objective, business goal, or meaningful visualization of that device's performance. The data items specified by a device profile 222 may be less than a total number of data items available on its corresponding device or set of devices, being a filtered subset of data items known to be relevant to a given analytic application (e.g., assessment of the device's performance or health, predictive maintenance analysis that predicts future device failures based on trends of one or more key performance indicators, or other such analysis). The device profiles 222 can also include connectivity information that can be used by the edge gateway component 206 to locate the specified data items, including but not limited to tag names, smart object identifiers, register identifiers, communication paths, or other such information. Some device profiles 222 may also define relationships between the specified data items, which can be used to model the data at the cloud level.

When configuring an edge gateway 406 for data collection, the user may select one or more available device profiles 222 corresponding to industrial assets of interest; e.g., by selecting the device profile 222 from a set of profiles 222 made available on the EaaS platform. Alternatively, in some scenarios, the edge gateway component 206 may automatically query the user's plant network to discover devices and industrial assets deployed at the plant facility, and the user interface component 204 can present the discovered devices to the user as selectable assets. The user can then select a device from this list as a data source, causing the edge gateway component 206 to retrieve and utilize an appropriate device profile 222 corresponding to the selected device. In yet another example, the user may enter a communication path to a device that will act as a data source, and the edge gateway component 206 can discover the device on the network 116 and retrieve its corresponding device profile 222 to be used in subsequent configuration steps.

Based on information contained in the device profiles 222, edge gateway component 209—which can be an instantiated component of an edge gateway 406—can submit a query to the industrial controllers 118 and devices 120 at the plant facility, either via an edge device 302 or via another interface between the industrial devices and the cloud platform. The query is directed to industrial controllers 118 and devices 120 having supported device profiles 222, and is designed to discover and retrieve relevant data items specified by the device profiles 222. In response to the query, the edge gateway component 206 obtains a list of discovered data items 804—e.g., data tags or smart objects 402 on the plant floor devices 118, 120—corresponding to data items specified by the device profiles 222. The user interface 204 then presents this list of discovered data items to the user via model configuration interfaces 802, to be described in more detail below.

Figure 9:
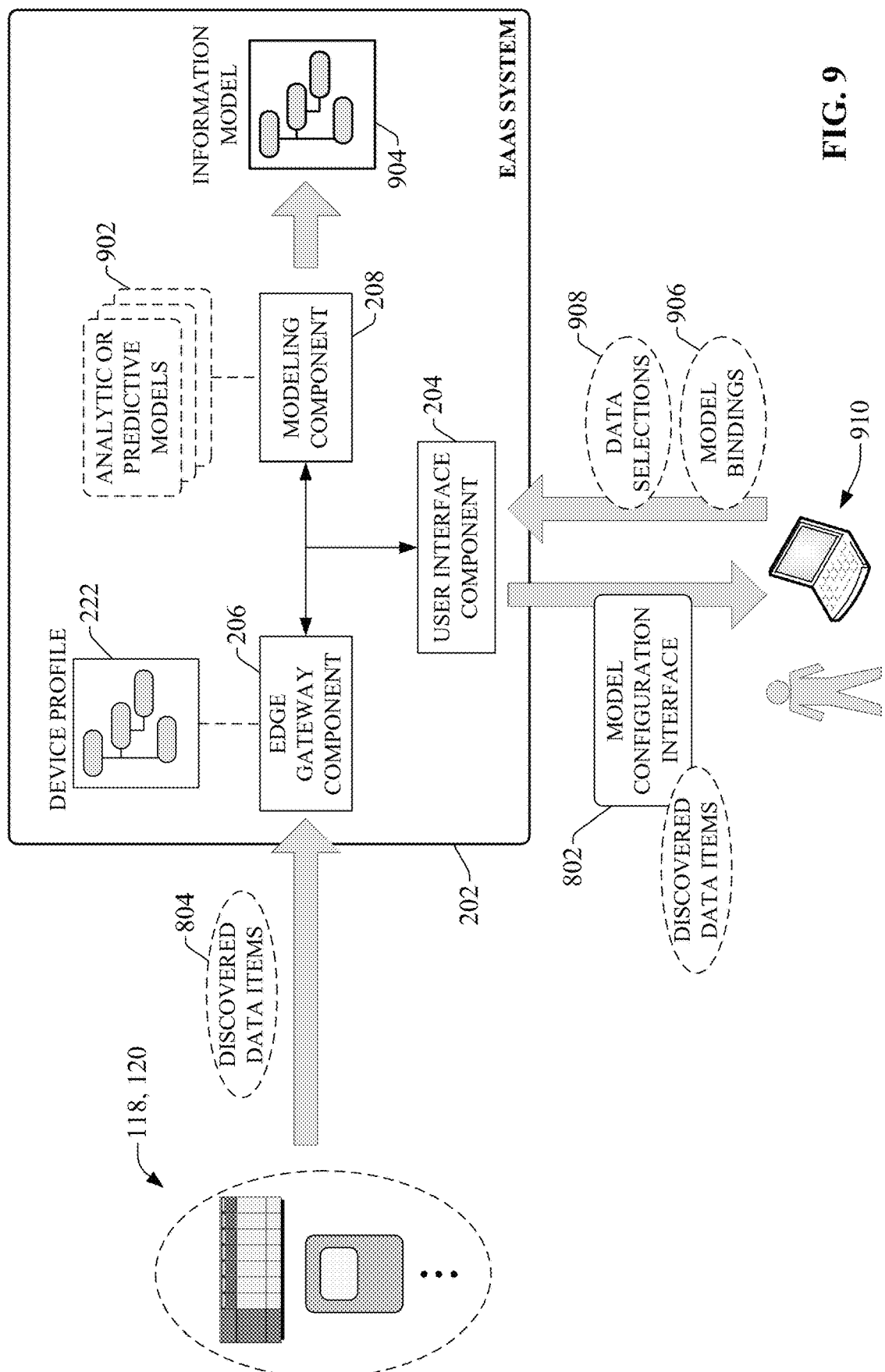
FIG. 9 is a diagram illustrating an example workflow enabled by the EaaS system for selecting and mapping data items from the plant floor devices to analytic or predictive models to yield an information model.

FIG. 9 is a diagram illustrating an example workflow enabled by the EaaS system 202 for selecting and mapping data items from the plant floor devices 118, 120 to analytic or predictive models 902 to yield an information model 904. Once the edge gateway component 206 has discovered and retrieved relevant data items 804 from the industrial devices 118, 120 (based on discovery information encoded in the device profiles 222), the user interface component 204 displays the available data items on a model configuration interface 802 rendered on the user's client device 910. The user can interact with the model configuration interface 802 to select an analytic or predictive model 902 to be applied to the data, and to submit data selections 908 and model bindings 906 that map selected subsets of the discovered data items 804 to the selected model 902. A modeling component 208 of the EaaS system 208 generates an information model 904 based on the data selections 908 and model bindings 906 submitted by the user. In this way, the EaaS system 202 allows control engineers without conventional IT development skills to easily create information models 904 based on their knowledge of the underlying control systems.

Figure 10:
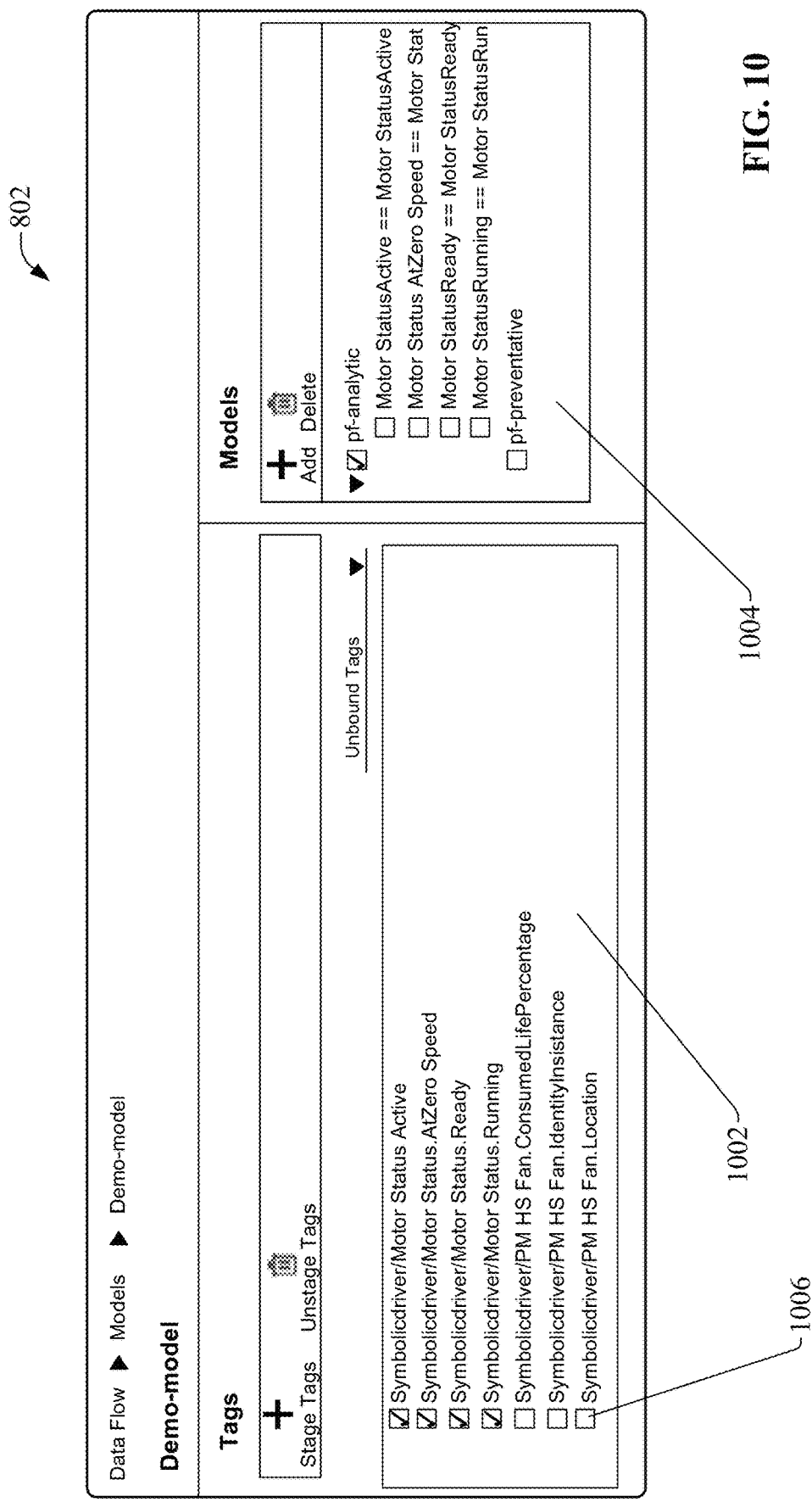
FIG. 10 is an example model configuration interface that can be generated by the user interface component.

FIG. 10 is an example model configuration interface 802 that can be generated by the user interface component 204 in one or more embodiments. Model configuration interface 802 comprises a tag section 1002 that lists the data items 804—e.g., data tags or smart objects 402—discovered by the edge gateway component 206 using the device profiles 222. The edge gateway component 206 can use a symbolic shortcut type to populate the tag section 1002 with human-readable tag listings representing the data items, which can be easily read and interpreted by the user. The data items 804 that can be made available for selective mapping to an information model may include not only controller and device data that is directly related to performance of the associated automation system, but also internal diagnostic data for the controllers 118 and devices 120 themselves, such as device fault conditions, sensor transition times, or other such information.

Model configuration interface 802 also includes a model section 1004 that allows the user to selectively add models to the current edge gateway project. The user can add a model by selecting an Add control in the model section 1004, which invokes a control that allows the user to either select from among a library of predefined models 902 (see FIG. 9) made available by the EaaS system 202, to import a custom model from another source, or to create a new model.

Substantially any type of model can be imported or created for use in the edge gateway 406. Some models may be simple egress models designed to map items of industrial data to corresponding registers or data fields of an external application 310 (e.g., a work order management system, a visualization application that generates graphical views of industrial asset performance, external analytic applications, or other such applications). Other models may be analytic models designed to generate insights into asset performance based on analysis of selected sets of data generated by the devices 118, 120 associated with the asset. Such analytic models can include, but are not limited to, predictive models designed to predict a failure or performance inefficiency of an industrial asset, prescriptive models designed to generate maintenance recommendations based on detected or predicted performance issues, or other such analytic models.

The EaaS system 202 can offer a variety of predefined models 902 that are specific to an industrial asset or device type, analytic functions (e.g., predictive maintenance, predictive business outcomes, performance assessment, energy consumption statistics, etc.), industrial verticals, or other such categories. Some predefined models 902 may also be specific to a target external or downstream application 310 to which device data can be egressed. Such models 902 may define data mappings to their corresponding applications 910; that is, mappings to data fields or registers of those applications that are to be populated by collected device data during operation.

When a new model is added to an edge gateway 406, the name of the model is displayed in the model section 1004. In the example illustrated in FIG. 10, the user has added two models—an analytic model named "pf-analytic" and a preventative maintenance model named "pf-preventative." Each data item displayed in the tag section 1002, as well as each model in the model section 1004, has an associated checkbox 1006 that can be selectively toggled on or off by the user. The user can select which of the discovered data items are to be mapped to a model by selecting checkboxes 1006 associated with the desired data items, and selecting the checkbox associated with the model to which the selected data items are to be mapped. In the example depicted in FIG. 10, the user has mapped four motor status data items—active, at zero speed, ready, and running—to the pf-analytic data model. When the data items and model have been selected, the selected data items appear in the model section 1004 below the model to which the data items have been mapped. Model configuration interface 802 thus allows the user to select, from among the data items discovered by the edge gateway component 206, a relevant subset of the data items that are likely to be useful to the selected model. Based on these user-defined model bindings, the modeling component 208 generates an information model 904 that can be used by the EaaS system 202 to contextualize the selected data items and egress the resulting contextualized data to an external or downstream application 310.

In some cases, the device profile 222 used to automatically discover and surface the available data items 804 can also be used to automatically create the information model 904. In such scenarios, the device profile 222 may not only define the data items 804 that are relevant to a given analytic or business objective (e.g., predictive maintenance, energy consumption, mapping of data to an external application 310), but can also define functional relationships or correlations between the data items that are relevant to the objective. Based on this device profile information, the edge gateway component 206 can discover the prescribed data items on the relevant industrial controllers 118 or devices 120, and the modeling component 208 can generate the information model 904 to reflect the data correlations defined in the device profile 222 and map the relevant data items to the model 904.

If a controller 118 or device 120 that supports smart objects 402 has a stored information model 602 (e.g., an information model 602 created as described above in connection with FIGS. 5-7), the edge gateway component 206 can also discover and retrieve this model 602 for use as the information model 904. In this scenario, when the user instructs the edge gateway 406 to connect to the controller 118 or device 120, the edge gateway component 206 can automatically detect the information model 602 defined on the device, and the modeling component 208 will import the discovered information model 602 as the information model 904 that will be used by the edge gateway 406. The resulting information model 904 will pre-contextualize the device data prior to egress to an external application 310. This approach can eliminate the need for the user to manually map data items to a selected model 902, since the edge gateway 406 uses the data modeling that has already been defined at the device level. Instead, the user can simply map the predefined information model 602 imported from the plant floor device to the desired application 310.

Figure 11:
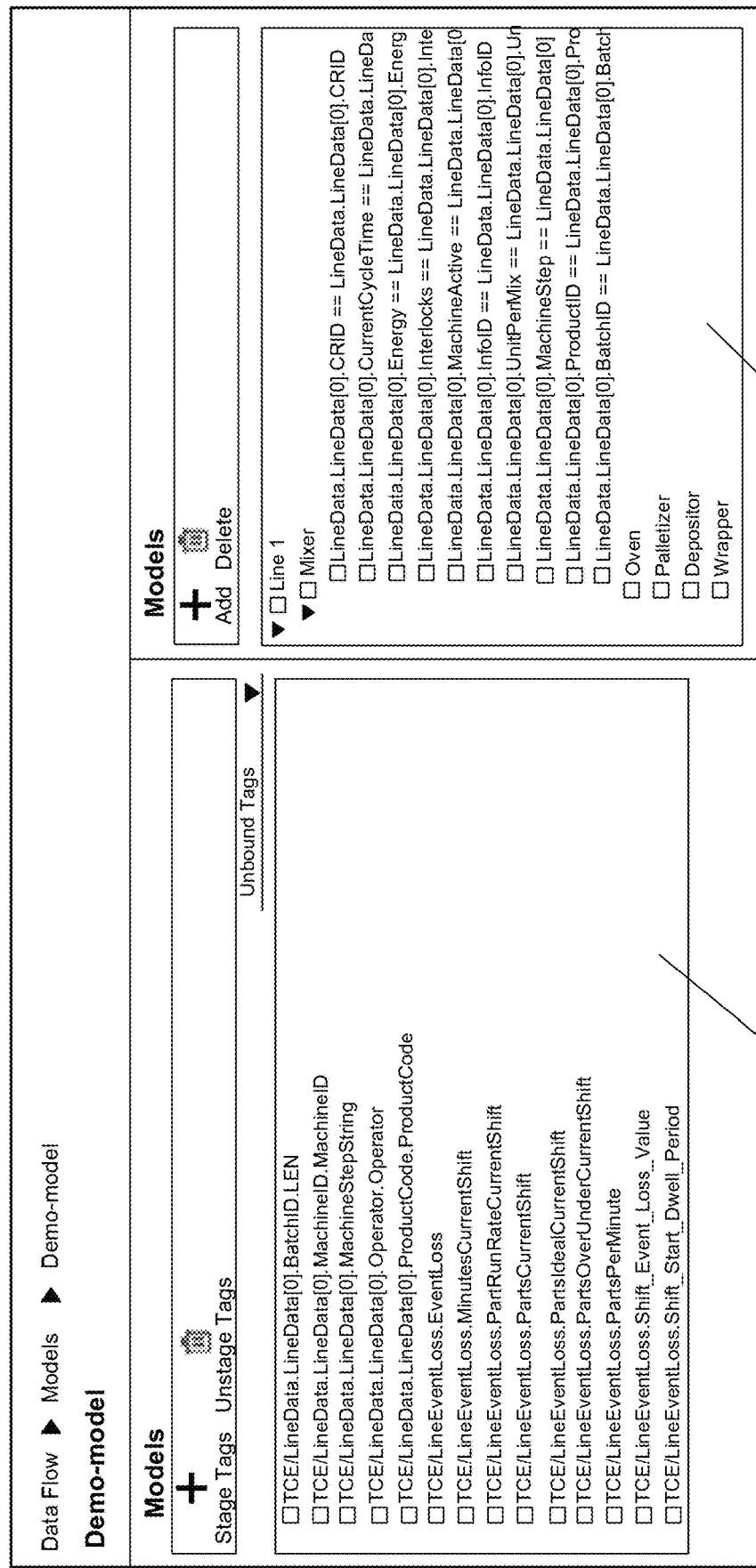
FIG. 11 is another view of a model configuration interface depicting an example scenario in which a device-level information model has been imported by an edge gateway.

FIG. 11 is another view of model configuration interface 802 depicting an example scenario in which a device-level information model 602 has been imported by the edge gateway 406. In this scenario, the modeling component 208 automatically generates the information model 904 to reflect the hierarchical relationships defined by the device-level information model 602. As shown in the model section 1004, the imported model comprises a hierarchical organization of selected data organized according to line (Line 1) and stations of the line (Mixer, Over, Palletizer, etc.), a format similar to that illustrated in FIG. 7. This data organization reflects the contextualization defined by the information model 602 retrieved from the controller 118 or device 120. In this way, the EaaS system 202 can automatically generate useful data models for export to target applications by leveraging predefined information models 602 stored on the industrial controllers 118 and devices 120 that act as the data sources.

These discovery and modeling tools supported by the EaaS system 202 allow a user to easily define asset analytics to be performed at the cloud level. The user can instruct an edge gateway 406 instantiated on the system 202 to connect to industrial controllers 118 and devices 120 at one or more plant facilities and to retrieve information from those devices to enable the desired analytic outcome, using device profiles 222 to automatically discover and map the relevant data items to information models 902, which can be used to contextualize and egress the data to external or downstream applications 310. Since the device models 222 can predefine the data subsets available on a given device that are relevant to a given analytic or business objective and present these data items in human-readable format, the user need not have preliminary knowledge of the underlying device data tags or the data requirements of the analytic model in order to create meaningful information models 904 that will be used by the edge gateway 406 to collect, contextualize, and egress the data.

Figure 12:
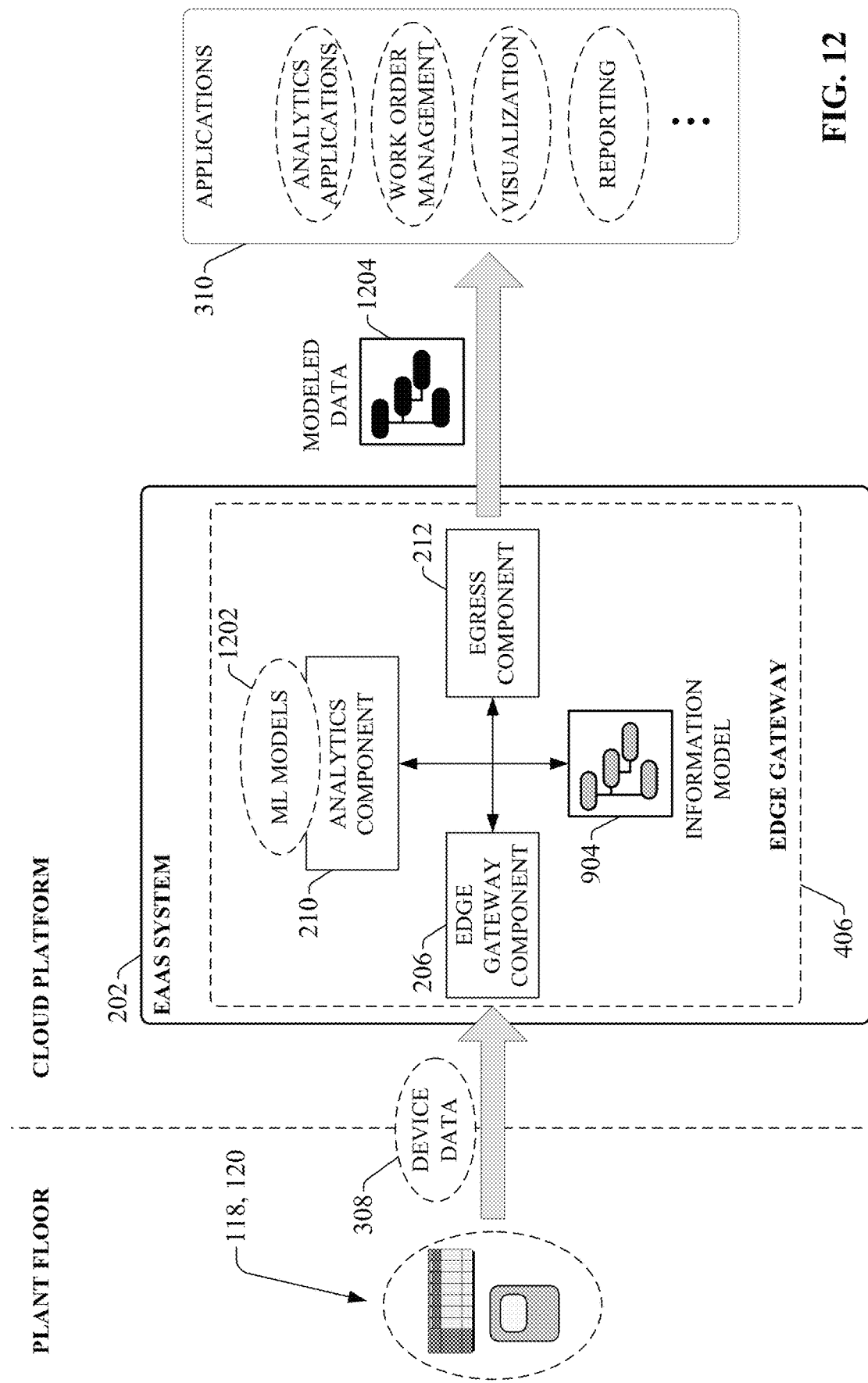
FIG. 12 is a diagram illustrating deployment of a configured edge gateway on an EaaS system for collection and contextualization of device data and egress of the resulting modeled data to an external or downstream application.

FIG. 12 is a diagram illustrating deployment of a configured edge gateway 406 on the EaaS system 202 for collection and contextualization of device data 308 and egress of the resulting modeled data 1204 to an external or downstream application 310. With the information model 904 defined, the edge gateway 406 can be deployed used by the EaaS system 202 to collect, model, and export device data 308 collected from the plant floor devices 118, 120. An instance of an edge gateway 406 for a given data collection project can comprise instances of the edge gateway component 206, egress component 212, and analytics component 210 configured in accordance with the information model 904. In some implementations, the edge gateway 402 can be deployed as a virtual machine that executes on the cloud-based EaaS platform.

At runtime, the information model 904 instructs the edge gateway component 206 as to what items of data are to be collected from the controllers 118 or devices 120 (e.g., data stored in data tags or smart objects 402 on those devices). The egress component 212 contextualizes this collected device data 308 using information model 904 and egresses the resulting modeled data 1204 to one or more external or downstream applications 310. Contextualizing the data 308 may involve, for example, populating the information model 904 with real-time values of the device data 308 referenced by the model 904 and mapping the resulting modeled data 1204 to the destination or target application 310. As noted above, the mapping of contextualized or modeled data 1204 to an application 310 can be defined by the information model 904, which instructs the egress component 212 as to how the modeled data 1204 is to be mapped to the application (e.g., an identifier of the application 310; mapping information defining which data containers, fields, or registers of the application 310 are to receive which items of modeled data 1204, etc.). Contextualizing the device data 308 may also involve adding metadata to selected data items defining functional or mathematical correlations between the data items, or defining conditions of the values of the data items (or trends in the values) that are indicative of predicted performance concern, asset failure, or other outcome.

Applications 310 to which the modeled data 1204 can be mapped can include applications that reside and execute on the same cloud platform on which the EaaS system 202 executes as a service, including applications 404 hosted by the EaaS system 202 itself (see FIG. 4). Applications 310 may also reside on external systems or platforms accessible via the cloud platform.

According to an example use case, a user may wish to monitor the fault status of multiple motor drives or other types of industrial devices that generate fault information or other such diagnostic information. To this end, the edge gateway 406 can be configured to collect real-time fault data 308 from the appropriate data registers of those motor drives. During configuration of the edge gateway 406, device models 222 corresponding to the motor drives are used to automatically discover and present the data items relevant to fault monitoring for selective mapping to an information model 904. The information model 904 defines a mapping between these data values and data fields of a notification application 310, which delivers real-time notifications to specified users when the data 308 for any of the motor drives indicates a fault status. The egress component 212 sends the data to the notification application 310 in accordance with the mapping defined by the information model 904.

The edge gateway 406 can also be used to pre-contextualize device data 308 for analysis by an external analytic application 310 and to send this modeled data 1204 to the analytic application 310 (e.g., a predictive or prescriptive maintenance application or other such analytic application). With the information model 904 defining correlations or relationships between selected items of device data 308, the edge gateway 406 can collect and transform the device data 308 in accordance with the information model 904 to yield modeled data 1204. Since the collected data is contextualized and structured based on relevant correlations and causalities defined by the model 904—that is, correlations and causalities defined as being relevant to a particular business or analytic objective—these correlations and causalities are provided to the analytic application 310 as modeled data 1204, which may comprise the collected data values together with metadata defining the relationships or correlations between the data items. The egress component 212 can feed this modeled data 1204 to the analytics application 310.

Informing an analytic application 310 of relevant data correlations and causalities between the data items can apply useful constraints on data analysis performed by the analytic application 310. These constraints can drive the analytic application 310 to useful insights more quickly relative to unconstrained big data analysis, significantly reducing the amount of time required for the analytic application 310 to discover insights and generate useful recommendations relative to the desired business objective. These predefined correlations and causalities can also mitigate discovery of spurious or irrelevant correlations between the data items by the analytic application 310. By limiting the set of data supplied to the analytic application 310 to only those data items deemed relevant by the model 904, and by structuring and contextualizing these data items based on predefined correlations and causalities, the edge gateway 406 narrows the data space to be analyzed by the analytic application 310, assisting the analytic system 1102 to discover useful insights and generate recommendations more quickly relative to unconstrained big data analysis.

In some configurations, the edge gateway 406 can also apply its own local analytics to the modeled data 1204 using analytics component 210. In such embodiments, the analytics component 210 may execute a machine learning model 1202 or another type of analytics model. During runtime, the analytics component 210 can apply this machine learning model 1202 to the incoming device data 308 or to the modeled data 1204, and the egress component 212 can export the modeled data 1204 to a downstream application 310 together with results of the analytics applied by the analytics component 210. Example machine learning models 1202 that can execute on the edge gateway 406 can include, but are not limited to, predictive maintenance models designed to predict failures of industrial assets based on learned trends in selected items of device data.

In some embodiments, the edge gateway 406 can allow users to define the information model 904 by combining existing models to create a more comprehensive data model that can be leveraged by downstream application for analytics, visualization, reporting, or notification. For example, smart object information models 602 defined on the controllers 118 and devices 120 can be imported and further contextualized by the edge gateway 406 using device models 222, machine learning models 1202, or other data models executed by the edge gateway 406. These combined models can yield modeled data 1204 that refines the device-level modeling with additional third-party models.

Some embodiments of the EaaS system 202 can provide cloud-based data managements services that store modeled data 1204, or data generated by downstream applications 310 based on analysis or processing of the modeled data 1204, in dedicated cloud storage allocated to an owner of the industrial assets from which the device data 308 was collected. The EaaS system 202 can allocate separate cloud storage spaces to registered industrial enterprises or asset owners, and allow each registered entity to configure and deploy edge gateways 406 as described above for collection, contextualization, and processing of device data 308 generated by their industrial assets. In addition to, or as an alternative to, sending the data to a target application 310 for analytics or visualization, the edge gateways 406 can archive the resulting modeled data 1204 in cloud storage assigned to the data owner; e.g., as time-series archived data or in a cloud-based relational database. Additionally, data generated from target applications 310 based on processing of the modeled data 1204—e.g., machine fault or downtime logs, work order management logs, predictive maintenance insights, etc.—can be stored securely in the owner's cloud storage allocation for subsequent access.

Once modeled data 1204 has been archived, asset owners with appropriate authentication credentials can access, view, or download their stored data via user interface component 204 or using any suitable data visualization or management application, including but not limited to industrial visualization or HMI applications, work order management applications, reporting applications, or other such applications.

The tools offered by embodiments of the EaaS system 202, including services for easily configuring an edge gateway 406 on the cloud platform, can simplify the process of configuring data collection, contextualization, and egress to analytic and maintenance-related applications.

Figure 13A:
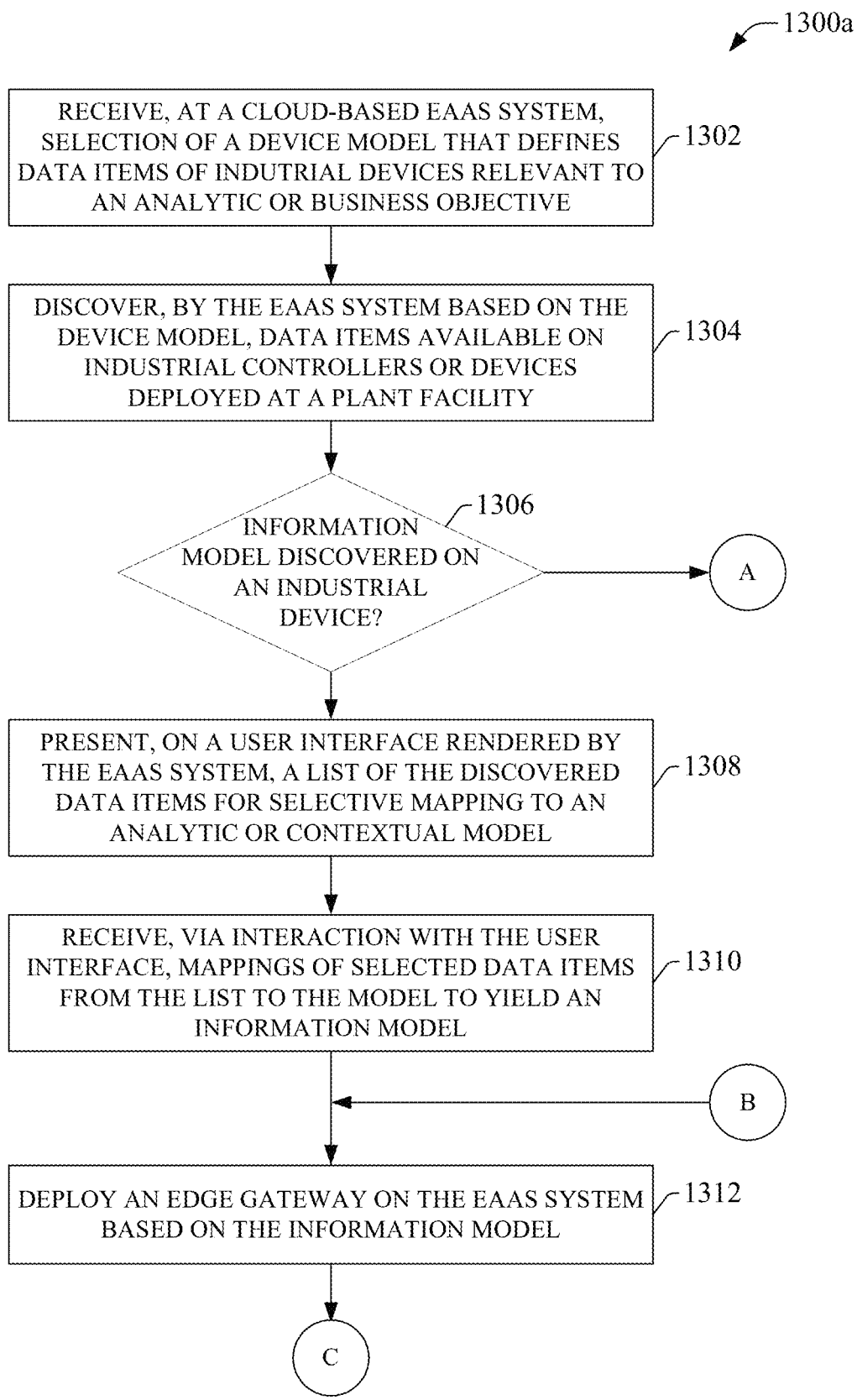
FIG. 13a is a flowchart of a first part of an example methodology for configuring a cloud-based edge gateway to collect, contextualize, and egress data from industrial controllers and devices to a target application.
Figure 13B:
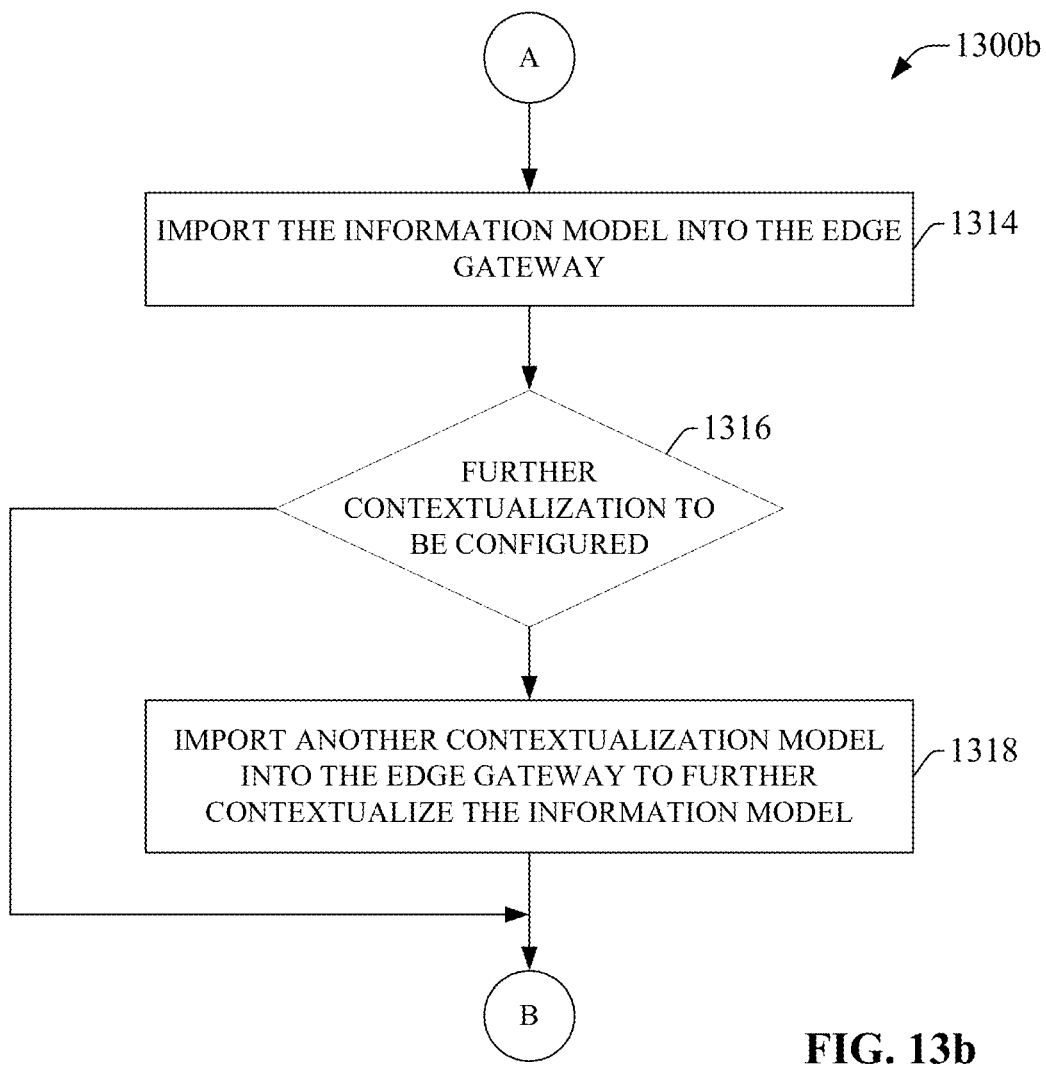
FIG. 13b is a flowchart of a second part of the example methodology for configuring a cloud-based edge gateway to collect, contextualize, and egress data from industrial controllers and devices to a target application.
Figure 13C:
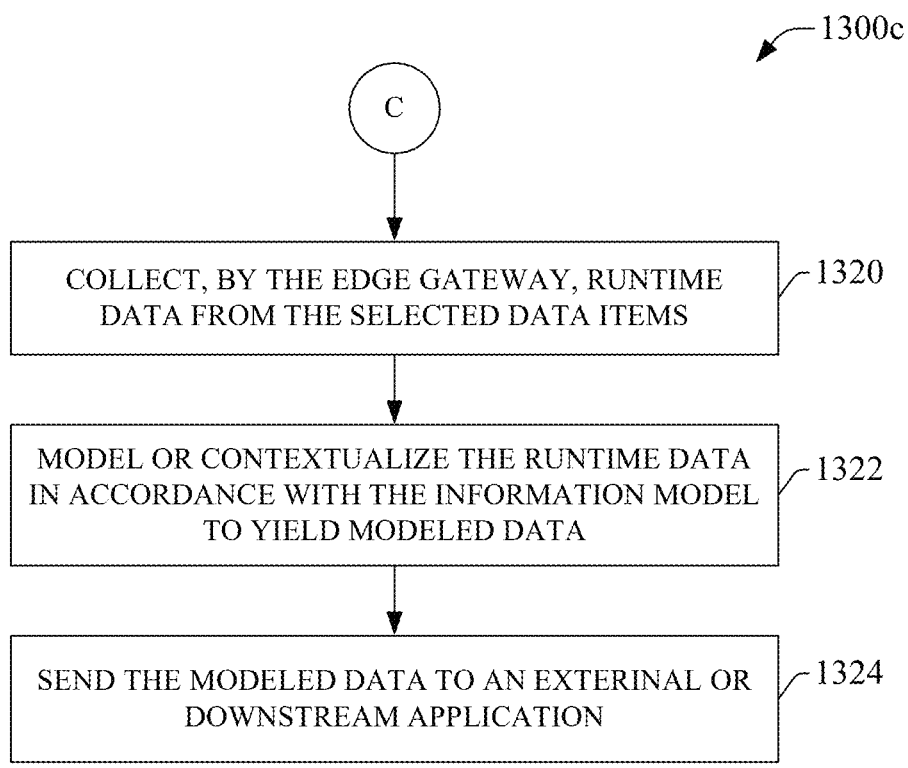
FIG. 13c is a flowchart of a third part of the example methodology for configuring a cloud-based edge gateway to collect, contextualize, and egress data from industrial controllers and devices to a target application.

FIGS. 13a-13c illustrate a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13a illustrates a first part of an example methodology 1300a for configuring a cloud-based edge gateway to collect, contextualize, and egress data from industrial controllers and devices to a target application. Initially, at 1302, selection of a device model is received at a cloud-based EaaS system. The device model can define data items of industrial devices that are relevant to an analytic or business objective. For example, the device profile may be defined for a specific type of device or industrial asset, and may specify data items that are relevant to predictive or prescriptive maintenance of the asset (e.g., predicting a future fault or performance concern based on historical trends of selected performance metrics), calculation of key performance indicators for the asset, visualization of the asset's performance metrics, or other such objectives.

At 1304, data items available on industrial controllers or devices deployed at a plant facility are discovered by the EaaS system based on the device model. The data items can be discovered by remotely polling the devices via the plant network on which the devices reside. If an edge device at the plant facility is used to interface the plant devices to the cloud platform, the EaaS system can poll the devices and discover the relevant data items via the edge device.

At 1306, a determination is made as to whether an information model is discovered on an industrial device as part of the data discovery process. The information model can be defined on an industrial device that supports the use of smart objects as containers for the device's measured and generated data. Such devices allow information models to be created that define relationships or correlations between the smart objects, effectively modeling the data at the device level for consumption by higher level applications or analytic systems.

If no information model is discovered on any of the industrial devices being polled (NO at step 1306), the methodology proceeds to step 1308, where a list of the discovered data items is presented on a user interface rendered by the EaaS system for selective mapping to an analytic or contextual model. The analytic or contextual model may be a model imported into the EaaS system to be applied to the device data, such as an organizational model that defines hierarchical or functional relationships between the data, a predictive or prescriptive maintenance model that defines useful data correlations relevant to a desired analytic outcome, or other such models. The model may also define mappings of data to an external or downstream application, such as a work order management system, a visualization system, a reporting system, an analytic model, or other such applications. Selection of data items from the list of discovered data items and mapping of the selected data to the model yields an information model that can be used by the edge gateway for data collection, contextualization, and egress.

Returning to step 1306, if an information model is discovered on an industrial device (YES at step 1306), the methodology proceeds to the second part 1300b illustrated in FIG. 13b. At 1314, the discovered information model is imported into the edge gateway. This imported information model can be used as the information model for the edge gateway as an alternative to, or in addition to, the information model created at step 1310. At 1316, a determination is made as to whether further data contextualization is to be configured. In this regard, the data contextualization represented by the imported information model can be combined with a third party or custom models to create a more comprehensive data model that contextualizes the data for use by downstream application for analytics, visualization, reporting, or notification. If further data contextualization is to be configured (YES at step 1316), the methodology proceeds to step 1318, where another contextualization model is imported into the edge gateway and combined with the imported information model to yield a refined information model.

The methodology then proceeds to step 1312 in the first part 1300a of the methodology, where the edge gateway configured using the previous steps is deployed on the EaaS system based on the information model. In some embodiments, the edge gateway can execute as a virtual machine on the EaaS platform. The methodology then proceeds to the third part 1300c illustrated in FIG. 13c, which represents runtime operation of the edge gateway. At 1320, the edge gateway collects runtime data (e.g., which may be time-series data or event-driven data) from the data items that were mapped to the model at step 1310 (or data items defined by the imported information model obtained from the industrial device at step 1314). At 1322, the runtime data is modeled or contextualized in accordance with the information model to yield modeled data. At 1324, the modeled data is sent to an external or downstream application. The target application may be, for example, a work order management system, a prescriptive or predictive maintenance system, an analytic system designed to generate insights into performance of industrial assets based on analysis of the modeled data, a visualization system that displays the modeled data—or analytic results obtained from applying analysis to the data—in a graphical or format, or other such systems.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safetyrated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 14:
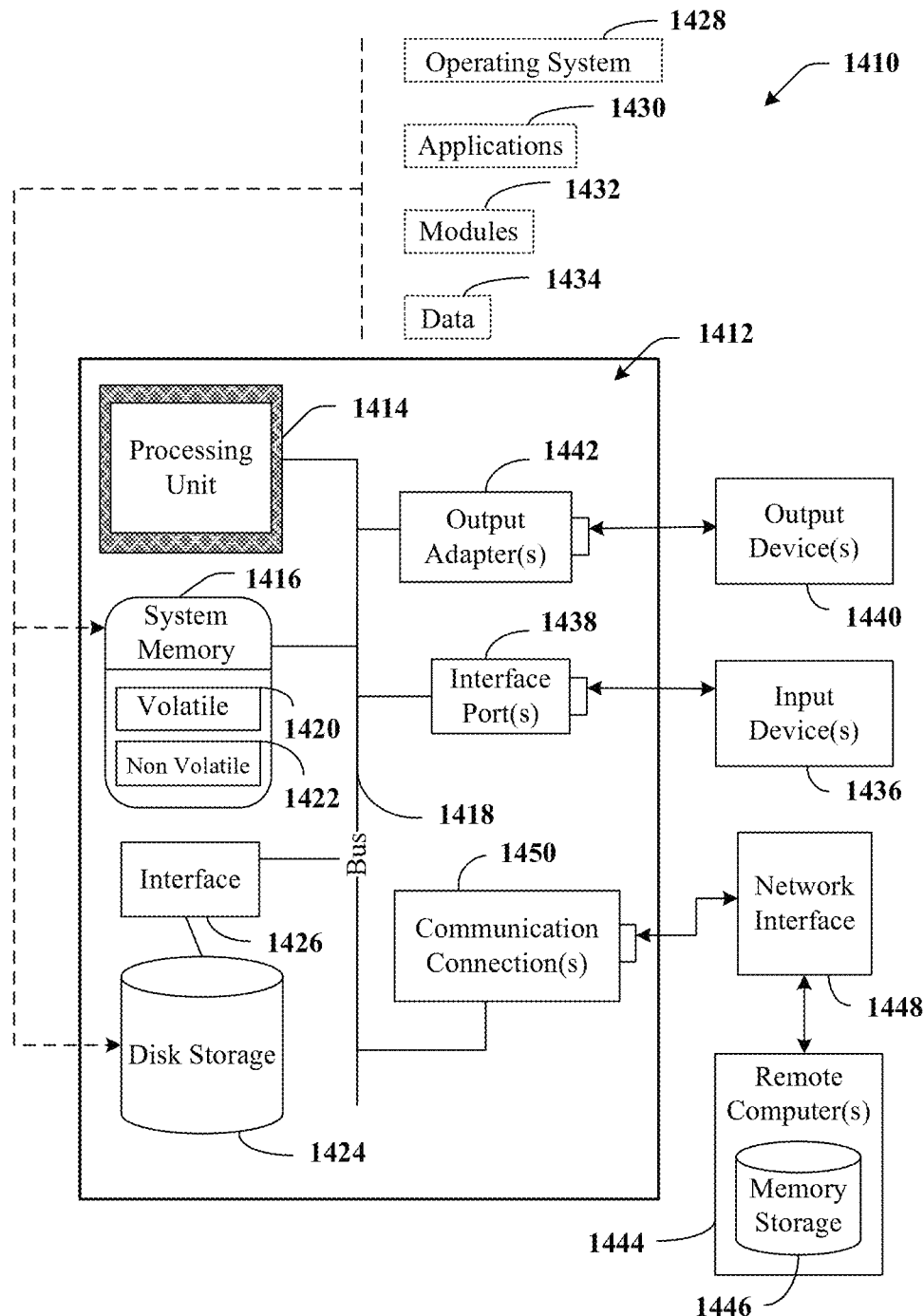
FIG. 14 is an example computing environment.
Figure 15:
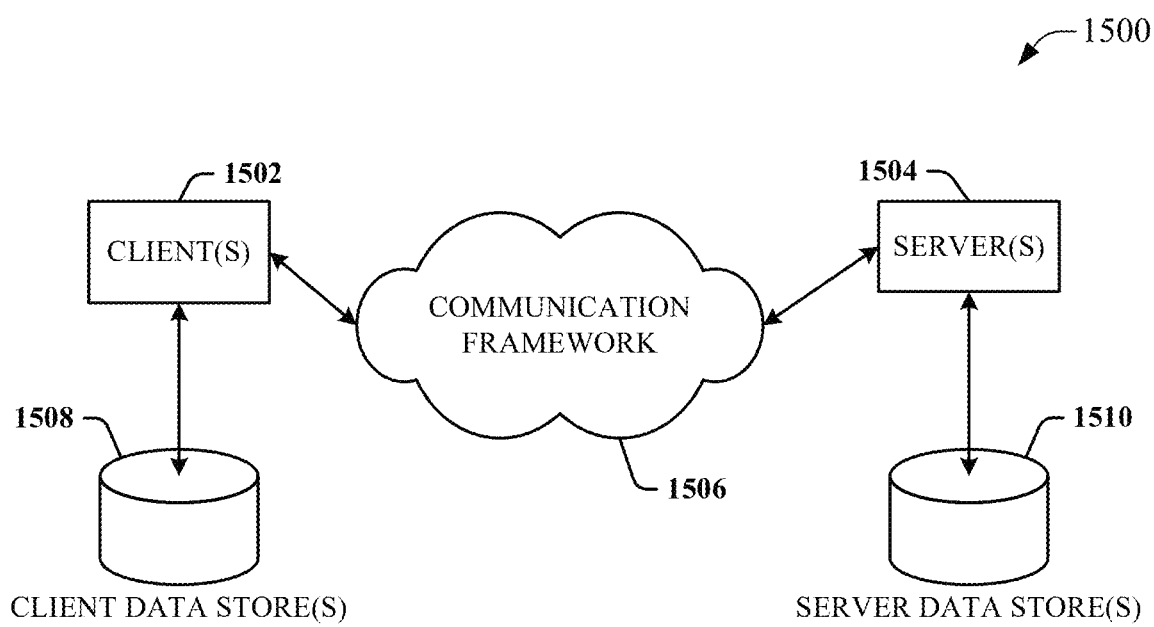
FIG. 15 is an example networking environment.

In order to provide a context for the various aspects of the disclosed subject matter, FIGS. 14 and 15 as well as the following discussion are intended to provide a brief, general description of a suitable environment in which the various aspects of the disclosed subject matter may be implemented.

With reference to FIG. 14, an example environment 1410 for implementing various aspects of the aforementioned subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Multi-core microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable PROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer 1412. System applications 1430 take advantage of the management of resources by operating system 1428 through program modules 1432 and program data 1434 stored either in system memory 1416 or on disk storage 1424. It is to be appreciated that one or more embodiments of the subject disclosure can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapters 1442 are provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1448 can also encompass near field communication (NFC) or Bluetooth communication.

Communication connection(s) 1450 refers to the hardware/software employed to connect the network interface 1448 to the system bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

FIG. 15 is a schematic block diagram of a sample computing environment 1500 with which the disclosed subject matter can interact. The sample computing environment 1500 includes one or more client(s) 1502. The client(s) 1502 can be hardware and/or software (e.g., threads, processes, computing devices). The sample computing environment 1500 also includes one or more server(s) 1504. The server(s) 1504 can also be hardware and/or software (e.g., threads, processes, computing devices). The servers 1504 can house threads to perform transformations by employing one or more embodiments as described herein, for example. One possible communication between a client 1502 and servers 1504 can be in the form of a data packet adapted to be transmitted between two or more computer processes. The sample computing environment 1500 includes a communication framework 1506 that can be employed to facilitate communications between the client(s) 1502 and the server(s) 1504. The client(s) 1502 are operably connected to one or more client data store(s) 1508 that can be employed to store information local to the client(s) 1502. Similarly, the server(s) 1504 are operably connected to one or more server data store(s) 1510 that can be employed to store information local to the servers 1504.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
   a memory that stores executable components; and
   a processor, operatively coupled to the memory, that executes the executable components, the executable components comprising:
   a user interface component configured to
      render configuration interfaces on a client device and to receive, via interaction with the configuration interfaces, a selection of a device profile, from a library of device profiles, corresponding to an industrial asset and defining data tags available on the industrial asset that are relevant to an analytic objective,
      render, based on the device profile, a list of the data tags, and
      receive, via interaction with the configuration interfaces, mapping input that binds a selected subset of the data tags from the list to an analytic model selected from a library of analytic models, wherein the analytic model corresponds to a target application and defines data mappings to the target application; and
   a modeling component configured to generate an information model based on the mapping input, wherein the information model defines a contextualization of the selected subset of the data tags and a mapping of the selected subset of the data tags to the target application based on the data mappings defined by the analytic model,
   wherein the system is configured to instantiate an edge gateway comprising the information model on a cloud platform, the edge gateway comprising:
      an edge gateway component configured to collect device data from the selected subset of the data tags specified by the information model, and
      an egress component configured to contextualize the device data based on the information model to yield modeled data, and to send the modeled data to the target application based on the mapping defined by the information model.

2. The system of claim 1, wherein the edge gateway executes on the cloud platform as a virtual machine.

3. The system of claim 1, wherein
   binding of the selected subset of the data tags to the analytic model maps the selected subset of the data tags to the target application in accordance with the data mappings defined by the analytic model.

4. The system of claim 1, wherein
the analytic model defines an organization of data, and
the egress component is configured to model the device data in accordance with the organization defined by the analytic model to yield the modeled data.

5. The system of claim 1, wherein
the device profile defines a modeling of the device data collected from the selected subset of the data tags, and
the modeling component configured to generate the information model further based on the modeling defined by the device profile.

6. The system of claim 1, wherein the target application is at least one of an analytic system that applies analytics to the modeled data, a predictive maintenance application that predicts industrial asset failures or performance issues based on analysis of the modeled data, a work order management system that generates maintenance work orders in response to detection of a performance issue based on analysis of the modeled data, or a visualization system that displays the modeled data.

7. The system of claim 1, wherein
the edge gateway further comprises an analytics component configured to apply a machine learning model to the device data or to the modeled data to yield an analytic result, and
the egress component is configured to send the analytic result to the target application.

8. The system of claim 7, wherein the machine learning model is a predictive maintenance model designed to predict a failure of an industrial assets based on learned trends in the device data or the modeled data.

9. The system of claim 1, wherein contextualization of the device data based on the information model comprises at least one of
organization of the device data based on a hierarchical organization of industrial assets defined by the information model, or
addition of contextual metadata to the device data that defines functional or mathematical relationships between the data tags.

10. A method, comprising:
rendering, by a system comprising a processor and executing on a cloud platform, a configuration interface on a client device;
receiving, by the system via interaction with the configuration interface, a selection of a device profile, from a library of device profiles, corresponding to an industrial asset, wherein the device profile defines data tags available on the industrial asset that are relevant to an analytic objective;
rendering, by the system based on the device profile, a list of the data tags on the user interface;
receiving, by the system via interaction with the configuration interface, mapping input that selects a subset of the data tags from the list to be bound to an analytic model selected from a library of analytic models, wherein the analytic model corresponds to a target application and defines data mappings to the target application;
generating, by the system, an information model based on the mapping input, wherein the information model defines a contextualization of the subset of the data tags and a mapping of the subset of the data tags to the target application based on the data mappings defined by the analytic model;
deploying, by the system, an edge gateway comprising the information model on a cloud platform, wherein the deploying comprises:
collecting, by the edge gateway, device data from the subset of the data tags in accordance with the information model,
contextualizing, by the edge gateway, the device data based on the information model to yield modeled data, and
sending, by the edge gateway, the modeled data to the target application based on the mapping of the subset of the data tags to the target application defined by the information model.

11. The method of claim 10, wherein the deploying further comprises executing the edge gateway as a virtual machine on the cloud platform.

12. The method of claim 10, wherein
the rendering comprises
discovering, by the system, the data tags on the industrial asset based on the device profile.

13. The method of claim 10, wherein
the receiving of hem aping input maps the subset of the data tags to the target application in accordance with the data mappings defined by the analytic model.

14. The method of claim 10, wherein
the analytic model defines an organization of data, and
the deploying of the edge gateway further comprises modeling the device data in accordance with the organization defined by the analytic model to yield the modeled data.

15. The method of claim 10, wherein
the device profile defines a modeling of the device data collected from the subset of the data tags, and
the deploying further comprises generating the information model further based on the modeling defined by the device profile.

16. The method of claim 10, wherein sending comprises sending the modeled data to at least one of an analytic system that applies analytics to the modeled data, a predictive maintenance application that predicts industrial asset failures or performance issues based on analysis of the modeled data, a work order management system that generates maintenance work orders in response to detection of a performance issue based on analysis of the modeled data, or a visualization system that displays the modeled data.

17. The method of claim 10, wherein the deploying further comprises:
applying, by the edge gateway, a machine learning model to the device data or to the modeled data to yield an analytic result, and
sending the analytic result to the target application.

18. A non-transitory computer-readable medium having stored thereon instructions that, in response to execution, cause a system comprising a processor and executing on a cloud platform to perform operations, the operations comprising:
rendering a configuration interfaces on a client device;
receiving, via interaction with the configuration interface, a selection of a device profile, from a library of device profiles, corresponding to an industrial device, wherein the device profile defines data tags available on the industrial device that are relevant to an analytic objective;
rendering, based on the device profile, a list of the data tags on the user interface;
receiving, via interaction with the configuration interface, mapping input that selects a subset of the data tags from the list to be bound to an analytic model selected from a library of analytic models, wherein the analytic model corresponds to a target application and defines data mappings to the target application;

generating an information model based on the mapping input, wherein the information model defines a contextualization of the subset of the data tags and a mapping of the subset of the data tags to the target application based on the data mappings defined by the analytic model;

deploying an edge gateway comprising the information model on a cloud platform, wherein the deploying comprises:
- collecting, by the edge gateway, device data from the subset of the data tags of the industrial device in accordance with the information model,
- contextualizing, by the edge gateway, the device data based on the information model to yield modeled data, and
- sending, by the edge gateway, the modeled data to the target application based on the mappings of the subset of the data tags to the target application defined by the information model.

19. The non-transitory computer-readable medium of claim 18, wherein the deploying further comprises executing the edge gateway as a virtual machine on the cloud platform.

20. The non-transitory computer-readable medium of claim 18, wherein
the analytic model defines an organization of data, and
The deploying further comprises modeling the device data in accordance with the organization defined by the analytic model to yield the modeled data.

* * * * *